(12) United States Patent
Ellis et al.

(10) Patent No.: US 10,169,756 B1
(45) Date of Patent: Jan. 1, 2019

(54) SYSTEM AND METHOD FOR A MOBILE WALLET

(71) Applicant: Wells Fargo Bank, N.A., San Francisco, CA (US)

(72) Inventors: Stephen M. Ellis, Tahoe City, CA (US); Michael J. Kennedy, San Francisco, CA (US); Ashish Bhoopen Kurani, Hillsborough, CA (US); Melissa Lowry, San Francisco, CA (US); Uma Meyyappan, Freemont, CA (US); Bipin M. Sahni, Pleasanton, CA (US); Nikolai Stroke, Gilbert, AZ (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 15/395,935

(22) Filed: Dec. 30, 2016

Related U.S. Application Data

(62) Division of application No. 14/341,384, filed on Jul. 25, 2014, now Pat. No. 9,600,815, which is a division of application No. 13/456,169, filed on Apr. 25, 2012, now Pat. No. 8,924,292.

(51) Int. Cl.
*G06Q 20/36* (2012.01)
*G06Q 20/32* (2012.01)
*G06Q 20/40* (2012.01)

(52) U.S. Cl.
CPC ......... *G06Q 20/36* (2013.01); *G06Q 20/3224* (2013.01); *G06Q 20/405* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| | | | |
|---|---|---|---|
| 7,873,579 B2 * | 1/2011 | Hobson | G06Q 20/02 380/52 |
| 8,020,763 B1 * | 9/2011 | Kowalchyk | G06Q 20/102 235/380 |
| 8,095,439 B1 | 1/2012 | Harman et al. | |
| 8,219,926 B2 | 7/2012 | Othmer | |
| 8,249,965 B2 | 8/2012 | Tumminaro | |
| 8,590,785 B1 | 11/2013 | Mesaros | |

(Continued)

OTHER PUBLICATIONS

Mobile Payments Industry Workgroup (MPIW), Industry Perspectives on Mobile/Digital Wallets and Channel Convergence, 'Payment Strategies Industry Specialist, Federal Reserve Bank of Boston', Elisa Tavilla . (Year: 2015).*

*Primary Examiner* — Frantzy Poinvil

(74) *Attorney, Agent, or Firm* — Foley & Lardner LLP

(57) ABSTRACT

A computer-implemented system and method includes receiving a first geographic location of a mobile device when a mobile wallet transaction is initiated, receiving a second geographic location of the mobile device after the mobile wallet transaction is initiated, comparing the first and second geographic locations to ensure a match, permitting the mobile device to process the mobile wallet transaction upon determining that the first and second geographic locations of the mobile device are within a predefined distance of each other, and transferring funds to a merchant after verifying that the second geographic location of the mobile device is within a predetermined distance of a location of the merchant.

15 Claims, 26 Drawing Sheets

(56) References Cited

U.S. PATENT DOCUMENTS

| | | | |
|---|---|---|---|
| 8,606,702 B2* | 12/2013 | Ruckart | G06Q 20/12 235/380 |
| 8,611,867 B2* | 12/2013 | Swanburg | G06Q 20/3223 455/405 |
| 8,612,352 B2 | 12/2013 | Dorsey et al. | |
| 8,662,389 B2 | 3/2014 | Dorsey et al. | |
| 8,671,018 B2* | 3/2014 | Thomas | G06Q 30/02 705/14.25 |
| 8,700,003 B2 | 4/2014 | Klein | |
| 8,706,557 B1 | 4/2014 | Tavares | |
| 8,881,975 B1* | 11/2014 | Matthews | G06Q 10/02 235/379 |
| 8,930,236 B2 | 1/2015 | Gillenson et al. | |
| 8,972,298 B2 | 3/2015 | Kunz et al. | |
| 9,424,603 B2* | 8/2016 | Hammad | G06Q 30/0639 |
| 2003/0055733 A1 | 3/2003 | Marshall et al. | |
| 2005/0165651 A1 | 7/2005 | Mohan | |
| 2007/0255653 A1* | 11/2007 | Tumminaro | G06Q 20/10 705/39 |
| 2008/0154704 A1 | 6/2008 | Flake et al. | |
| 2010/0106611 A1 | 4/2010 | Paulsen et al. | |
| 2011/0191184 A1 | 8/2011 | Blackhurst et al. | |
| 2011/0246306 A1 | 10/2011 | Blackhurst et al. | |
| 2011/0270618 A1 | 11/2011 | Banerjee et al. | |
| 2012/0066096 A1* | 3/2012 | Penide | G06Q 20/12 705/27.1 |
| 2012/0150696 A1 | 6/2012 | Sheu et al. | |
| 2012/0197773 A1 | 8/2012 | Grigg et al. | |
| 2012/0203666 A1 | 8/2012 | Torossian et al. | |
| 2012/0253852 A1* | 10/2012 | Pourfallah | G06Q 20/3276 705/4 |
| 2013/0013385 A1* | 1/2013 | Mesaros | G06Q 30/0207 705/14.25 |
| 2014/0052533 A1 | 2/2014 | Mesaros | |
| 2014/0278989 A1* | 9/2014 | Calman | G06Q 30/0215 705/14.55 |
| 2014/0279006 A1 | 9/2014 | Calman et al. | |
| 2014/0279008 A1* | 9/2014 | Calman | G06Q 30/0215 705/14.58 |
| 2014/0324627 A1* | 10/2014 | Haver | G06O 30/0639 705/26.9 |
| 2015/0254657 A1* | 9/2015 | Bondesen | G06Q 20/227 705/44 |
| 2015/0254698 A1* | 9/2015 | Bondesen | G06Q 30/0215 705/14.17 |
| 2015/0278811 A1* | 10/2015 | Lalchandani | G06Q 20/40 705/42 |
| 2016/0019657 A1 | 1/2016 | Mande | |
| 2016/0098742 A1 | 4/2016 | Minicucci et al. | |
| 2016/0225007 A1 | 8/2016 | Logsdon | |

* cited by examiner

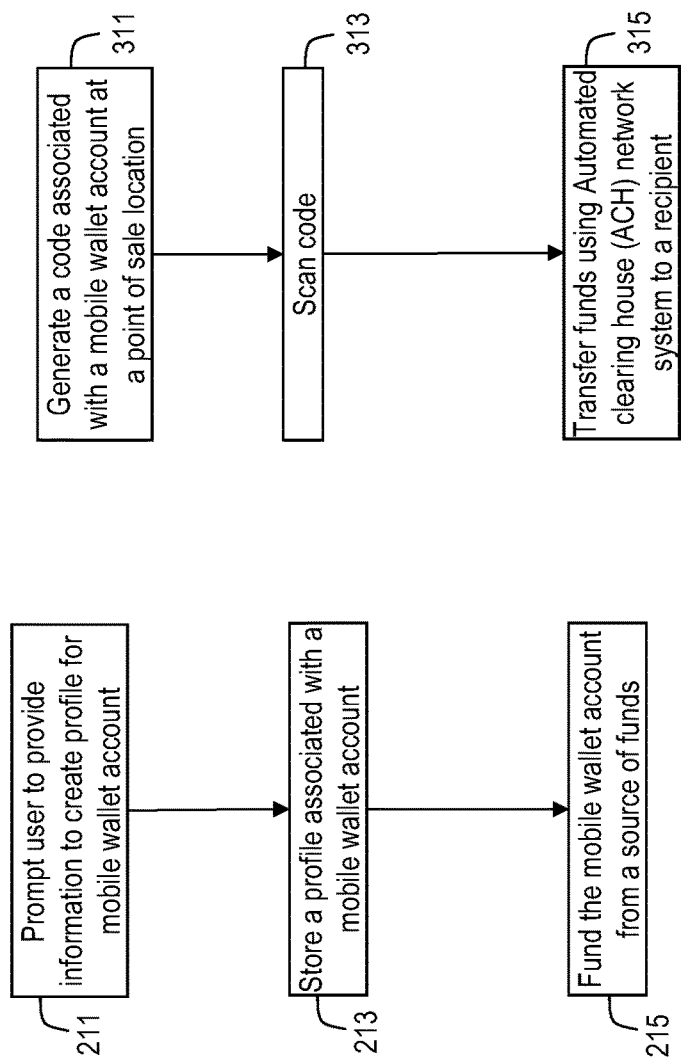

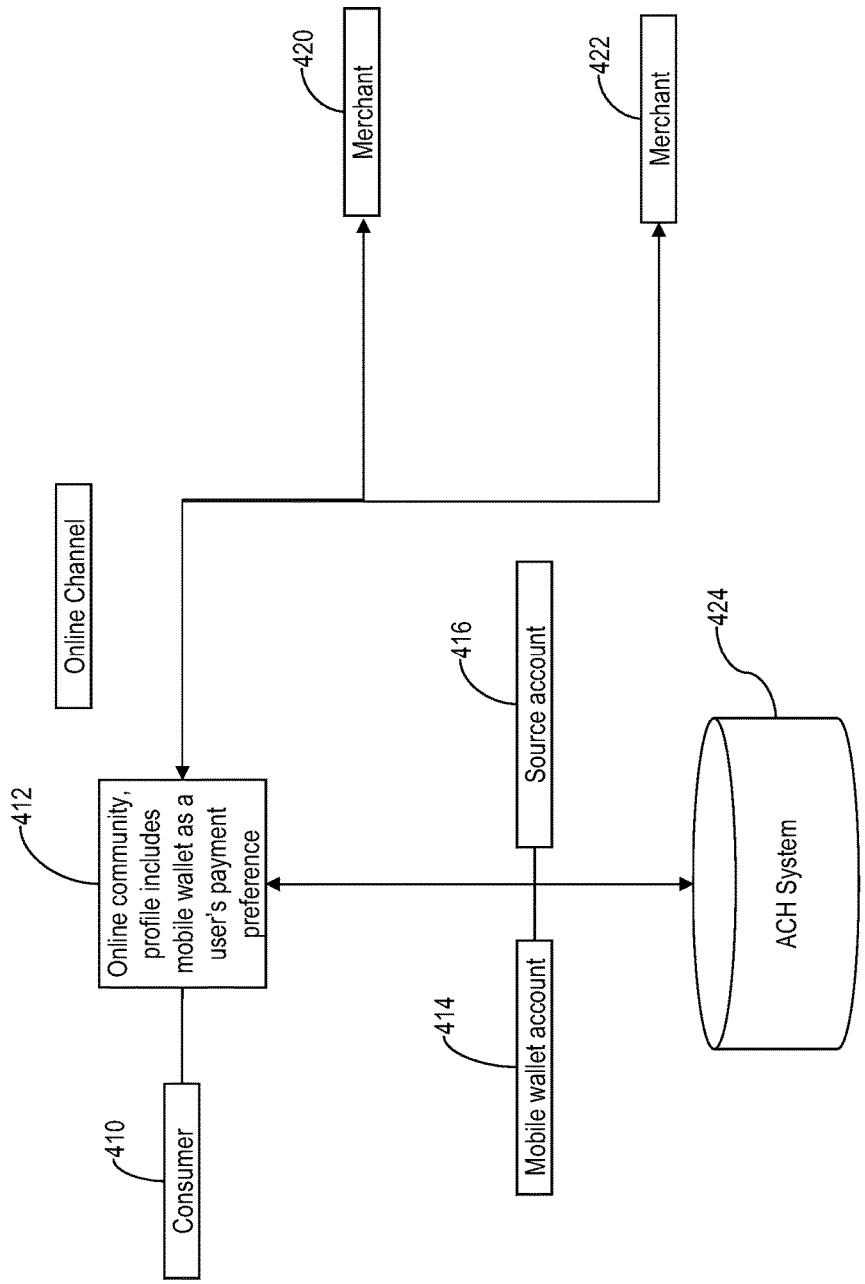

SYSTEM AND METHOD FOR A MOBILE WALLET

CROSS-REFERENCE TO RELATED PATENT APPLICATIONS

This application is a divisional of U.S. patent application Ser. No. 14/341,384, filed on Jul. 25, 2014, now U.S. Pat. No. 9,600,815 and entitled "SYSTEM AND METHOD FOR A MOBILE WALLET," which is a divisional of U.S. patent application Ser. No. 13/456,169, filed on Apr. 25, 2012, now U.S. Pat. No. 8,924,292 and entitled "SYSTEM AND METHOD FOR A MOBILE WALLET," both of which are hereby incorporated by reference in their entireties and for all purposes.

FIELD

The present invention relates generally to the field of mobile wallets. More specifically, the present invention relates to systems and methods for enabling individuals to use their electronic devices to transfer funds and purchase products and services.

BACKGROUND

Payments for products and services are often completed using credit cards, debit cards, checks or cash. At the same time, most people carry some type of mobile handheld electronic device, such as a cellular phone, smart phone, mobile handheld wireless e-mail device, personal digital assistant, portable gaming devices, and so on. Most of these devices tend to have a wireless internet connection. A person may wish to make payments to merchants using these mobile devices. Likewise, a person may wish to transfer funds to other individuals using their mobile devices. Enhanced systems and methods of facilitating such transactions would be desirable.

SUMMARY

One embodiment relates to a computer-implemented method that includes receiving a request to perform a transaction between a user having a mobile device and the user having account at a financial institution and a merchant. The method includes determining a first location of the user based on a location of the mobile device and the method includes determining a second location of the user based on a location of the merchant. The first and second locations are compared to ensure a match between the two locations. The method further includes receiving an identifier that is embedded in a code that is displayable on the mobile device. The method includes transmitting an indication that the transaction has been completed based on the identifier and based on the match of the first and second location.

Another embodiment relates to a computer implemented method that includes receiving a request to initiate a transaction between an account holder with a mobile device and a merchant. The method includes generating a code that is displayable on the mobile device including embedding in the code a transaction identification number, a geographic location of the mobile device, a timestamp for the financial transaction. This embodiment may additionally include sending the code to the mobile device for the merchant to send to a financial institution to request funds from an account held by the account holder.

Another embodiment relates to a computer implemented method that includes receiving a request for a code to provide to a merchant, the code being generated for a mobile device that belongs to an account holder. The method includes generating the code, including embedding in the code a transaction identification number, a geographic location of the mobile device, a timestamp. The code to the mobile device for the merchant may be sent to a financial institution to request funds from an account held by the account holder. The method includes receiving the request for funds from the merchant including a location of the merchant and an amount of the transaction and sending the requested funds to the merchant upon verifying the geographic location of the mobile device is within a predetermined distance of the location of the merchant.

BRIEF DESCRIPTION OF THE DRAWINGS

FIG. 2 is a process implemented by the payment processing system of FIG. 1 to create a mobile wallet account.

FIGS. 3A-3C are processes implemented by the payment processing system of FIG. 1 to transmit funds to a recipient.

FIG. 4 is a flow diagram of a payment channel according to an example embodiment.

DETAILED DESCRIPTION

Figure 1:
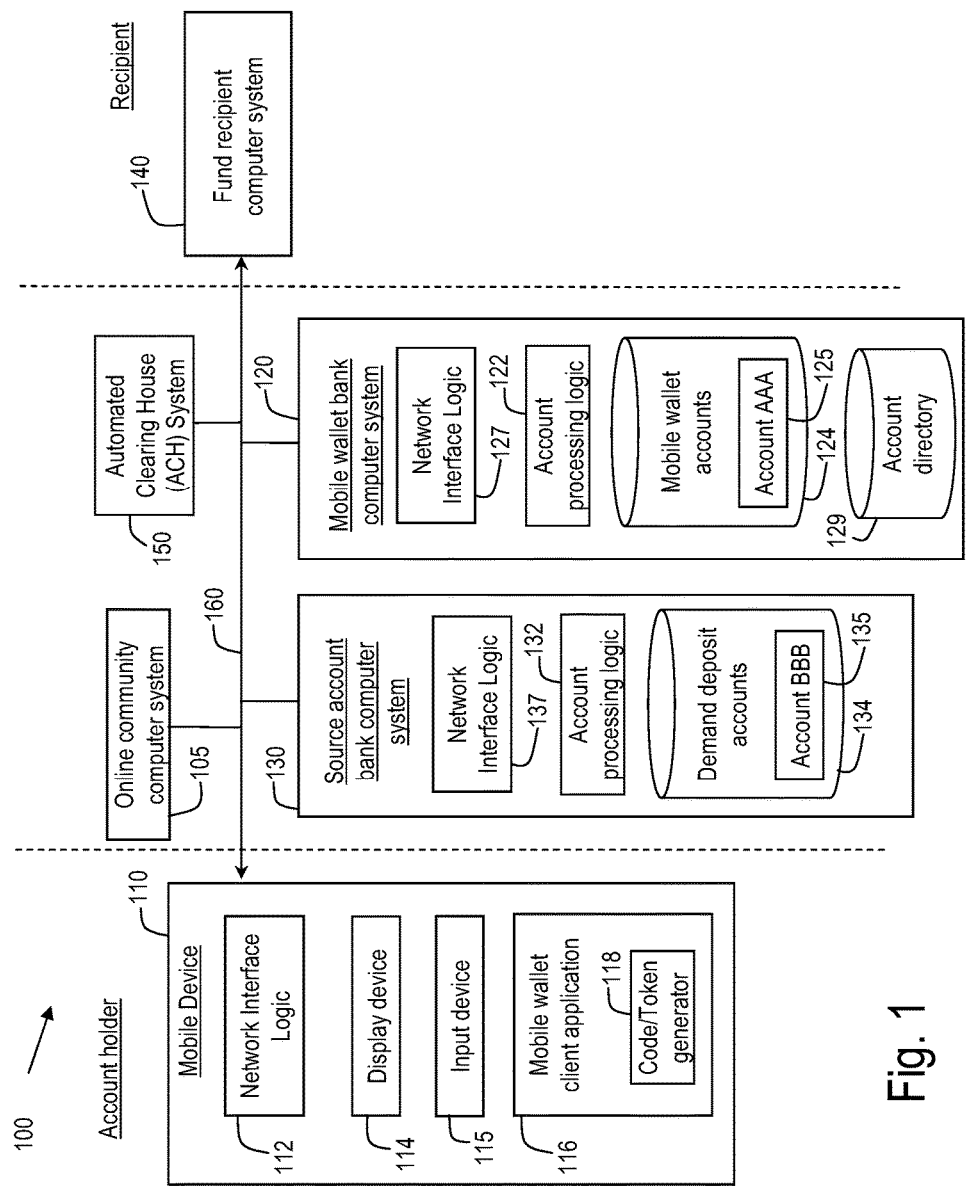
FIG. 1 is a schematic diagram of a computer-implemented payment processing system according to an example embodiment.

Referring to FIG. 1, a computer-implemented payment processing system 100 is shown that may be used by a user to set up and utilize a mobile wallet account. The user may be a business entity and/or an individual consumer that has one or more source accounts with a financial institution. The source accounts may include business or consumer accounts. The mobile wallet account can be created for the user to transmit funds in return for purchase of goods or services to a merchant. Additionally, funds can be transferred from the mobile wallet account to another person.

Payment processing system 100 may include, among other systems, an online community computer system 105, a mobile device 110, mobile wallet bank computer system 120, source account bank computer system 130, a fund recipient computer system 140, and a payment network 150. The online community computer system 105, the mobile device 110, the mobile wallet bank computer system 120, the source account bank computer system 130, and the fund recipient 140 may communicate through a network 160, which may include one or more of the Internet, cellular network, Wi-Fi, Wi-Max, a proprietary banking network, and so on. The online community computer system 105, the mobile wallet bank computer system 120, the source account bank computer system 130, and the payment network 150 may each comprise a computer system (e.g., one or more servers each with one or more processors) configured to execute instructions, send and receive data stored in memory, and perform other operations to implement the operations described herein associated with logic or processes shown in FIGS. 2A through 16.

The online community computer system 105 implements an online community of individuals. The online community may be any internet destination (e.g., website) where users may obtain user names/login IDs or otherwise become registered members. The individuals may, for example, use the online community to interact with each other and/or to interact with a service provided by the computer system 105. Examples of online communities include MSN®, iPhone® users, Facebook®, LinkedIn®, and so on.

Members of the online community may be offered mobile wallet accounts as a service that is available through the online community. The mobile wallet accounts, for example, may be created through the online community, may be accessible through the online community, may be branded with the trademarks of the online community, and so on. Although in the illustrated embodiment the mobile wallet account is created and accessed through an online community, it will be appreciated that the mobile wallet account may be established in other ways, for example, through an online banking area of a web site of the banking institution that operates the mobile wallet bank computer system 120 and that maintains the mobile wallet account.

The mobile device 110 may be used by an individual user (e.g., a business owner or employee, a consumer, and so on) to create and interact with a mobile wallet account. The mobile device 110 may, for example be, a cellular phone, smart phone, mobile handheld wireless e-mail device, personal digital assistant, portable gaming devices, or other suitable device. The mobile device 110 comprises a network interface logic 112, a display device 114, an input device 115, and a mobile wallet client application 116. Network interface logic 112 may include, for example, program logic that connects the mobile device 110 to the network 160. As described in greater detail below, for example, the mobile device 110 may receive and display screens including account information, transaction instructions, and so on. In an example embodiment, such screens may be used to request a username and password information. Such screens may also be used to prompt the user to provide information regarding the amount of the payment and which merchant or individual (e.g., name, address, phone number or e-mail, a selection of a recipient by the user from his memory or from by the user from the mobile device 110, and so on) is to receive the payment. Such screens are presented to the user via the display device 114. The input device 115 may be used to permit the user to initiate account access and to facilitate receiving requested information from the user. As will be appreciated, in addition to or instead of the mobile device 110, users may also be provided with the ability to access the payment processing system 100 using another type of computer (e.g., a desktop or laptop computer executing browser software) to perform the operations described herein as being performed by the mobile device 110.

The mobile wallet client application 116 may comprise program logic executable by the mobile device to implement at least some of the functions described herein. As will be appreciated, the level of functionality that resides on the mobile device 110 as opposed to the online community computer system 160 may vary depending on the implementation. The client application 116 may simply be a web browser that is configured to receive and display mobile web pages received from the online community computer system 160 (e.g. web pages prompting the user to provide information to create an account, web pages displaying account balance information and past transactions, and so on). The mobile wallet client application 116 may also include a code/token generator capable of generating a unique code/token for each transaction. As described below, the unique code/token may then be transmitted by the mobile device 110 as part of a transaction to facilitate authentication of the transaction. As will be appreciated, the user may also use other devices (e.g., laptop or desktop computer system, not shown) to create and access accounts through the online community.

In another embodiment, the mobile device 110 may be connected to another mobile device that cooperates with the mobile device 110 to provide the functionality described herein. For example, the other mobile device may be a wrist watch or a small object with a small screen that a person can wear (e.g. pendant, ring, etc.). The other mobile device can be configured to wirelessly communicate with the mobile device 110 to receive and send updates regarding mobile wallet activities. The other mobile device may display information that is otherwise described herein as being displayed by display 114. For example, the other mobile device may display messages to the user regarding various offers, receipts and activities. The user may speak a message to the other mobile device to store the message in the mobile device 110. The other mobile device may have a processor that is configured to store information in memory. The other mobile device may include a alphanumeric keyboard and also display time, temperatures, and weather information which can be updated from the mobile device 110.

The mobile wallet bank computer system 120 includes account processing logic 122, an accounts database 124, network interface logic 127, and an account directory 129. In an example embodiment, the computer system 120 is operated by a first banking entity that maintains and handles transaction processing for the mobile wallet accounts. For example, the mobile wallet accounts may be created via interaction of the mobile wallet application 116 with the mobile wallet computer system 120. The user may or may not have conventional bank accounts with the banking entity that maintains the computer system 120. If the user does not have bank accounts with the entity that maintains the computer system 120, then accounts associated with another banking entity may also be used, as described below. As another example, the mobile wallet accounts may be created and accessed through the online community, as previously indicated. Again, in such an embodiment, the flow of funds into and out of the mobile wallet accounts may also be processed by the first banking entity using the mobile wallet computer system 120.

The computer system 120 is configured to store information regarding mobile wallet accounts. By way of example, information for a specific mobile wallet account, designated by reference numeral 125, is shown as being stored in a database 124. As will be appreciated, database 124 may also store information regarding many other mobile wallet accounts (not shown). As will also be appreciated, the extent to which transaction details are tracked and maintained in the account processing logic 124 as compared to the extent to which transaction details are tracked and maintained by the online community computer system 105 may vary depending on the implementation.

The mobile wallet account 125 holds funds that are transmitted to a recipient 140 upon receiving instructions from the user through the mobile device 110. As described below, funds flow into and out of the mobile wallet account 125 through the payment network 150. The mobile wallet account logic 120 is connected to the online community computer system 105 and the payment network 150 through the network 160. Network interface logic 127 may include, for example, program logic that connects the computer system 120 to the network 160. The mobile wallet account logic also includes an account directory 129. As discussed in greater detail below, the account directory 129 can maintain correlating information regarding a potential recipient's phone number, address or e-mail address, e.g., to facilitate transferring funds to individuals where account information is not known.

The source account computer system 130 includes account processing logic 132, an accounts database 134, and network interface logic 137. The bank account logic 139 may be operated by a second banking entity that maintains and handles transaction processing for source accounts. In an example embodiment, as previously indicated, during creation of the mobile wallet account 125, the user may be prompted to identify a source account 135, that is, a source of funds for the mobile wallet account. The source account 135 may be an existing demand deposit account held by the user with another financial institution. When the mobile wallet account 125 is created, the user is prompted to provide bank account information (e.g., routing number and/or account number) for the source account 135 that is used as a source of funds for the mobile wallet account 125. Thus, the financial institution that provides the mobile wallet account 125 for the user (through the online community) and the financial institution that typically provides banking services to the user may be two different financial institutions. Although in the illustrated embodiment the computer systems 120 and 130 are shown as being separate and as communicating through the Internet, it will be appreciated that the computer systems 120 and 130 may also be integrated in a single payment processing system (e.g., if the two financial institutions are the same).

The fund recipient computer system 140 may be configured in generally the same manner as the other computer systems described herein. For example, if the fund recipient is an individual, the computer system 140 may be another mobile device, such as a cellular phone, smart phone, mobile handheld wireless e-mail device, personal digital assistant, portable gaming devices, or other suitable device. If the fund recipient is a merchant (e.g., a brick and mortar merchant, a retail website or other online merchant, etc.), the computer system 140 may comprise a computer system (e.g., one or more servers each with one or more processors) configured to execute instructions, send and receive data stored in memory, and perform other operations to implement the operations described herein associated with the fund recipient.

The payment system 150 is used to transmit funds from the source account 135 to the mobile wallet account 125 and from the mobile wallet 125 to the recipient 140 (either directly or indirectly through the online community). In one embodiment, the payment system 150 is the Automated Clearing House network. As is known, the ACH Network is a nationwide batch-oriented electronic funds transfer system which provides for interbank clearing of electronic payments for participating depository financial institutions. An ACH entry can start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it be debit or credit) towards an account without prior authorization from the Receiver. Once authorization is received, the Originator then creates an ACH entry to be given to an Originating Depository Financial Institution (ODFI), which can be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. The RDFI may, however, reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified.

FIG. 2 is an example process that can be implemented by the payment processing system 100 of FIG. 1 to create a mobile wallet account 125. At step 211, the user is prompted to provide information to create a mobile wallet account. For example, if the mobile wallet is provided through the online community, the user may be prompted to register with the online community if the user has not already done so. The user may also be prompted to provide information to create a user profile, such as information regarding the source account 135 (e.g., bank account number and routing information, credit card or debit card number, etc.). At step 213, the user profile is stored based on input received from the user. At step 215, the mobile wallet account 125 is funded. The funds can be received by the mobile wallet account 125 from the source account 135 through the ACH system 150. In other embodiments, the mobile wallet account 125 can receive funds from any source of funds, such as brokerage accounts, bank accounts, credit card accounts, retirement account, and so on.

Figure 3C:
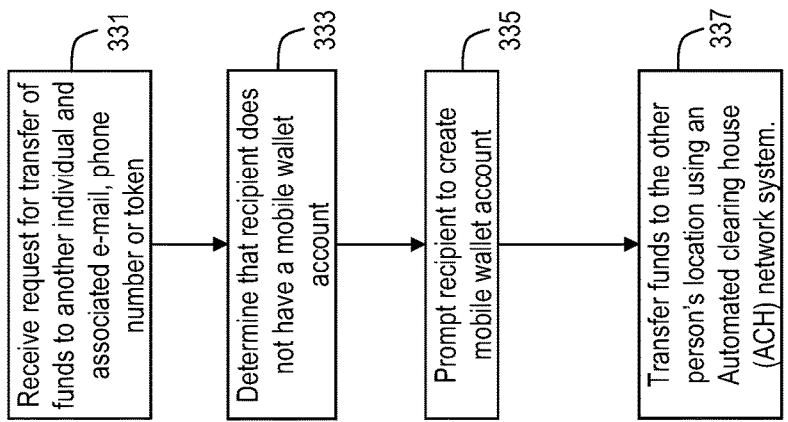
Figure 3B:
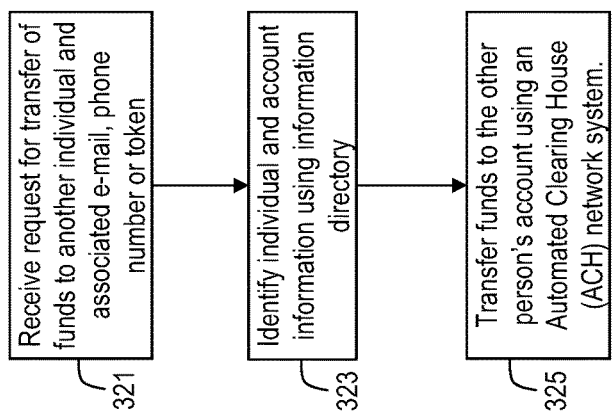

Referring next to FIGS. 3A-3C, various examples in which payments are made from the mobile wallet account 125 are shown. In FIG. 3A, a payment is made to a merchant (e.g., a "brick and mortar" merchant) and the mobile device 110 is present at the point of sale. At step 311, the code generator 118 of the mobile device 110 generates a unique code for a transaction at a point of sale location. As described in connection with FIG. 10 below, the unique code may be embedded in a bar code which is read by a bar code scanner operated by the merchant at step 313. For example, successful authentication of the unique code by the computer system 120 may be necessary for successful completion of the transaction by the merchant. Upon successful authentication, the computer system 120 may transmit a message to the merchant indicating that the transaction is "approved." Next, in step 315, funds are transferred using the ACH system 150 to the merchant. In yet another embodiment, the code can be transmitted via radio frequency (Bluetooth, RFID, NFC and the like) to a scanner at the point of sale. In yet another embodiment, the code may be an image that is a bar code, two dimensional bar code (QR code), a two dimensional bar code that includes color and/or time. When the code is sent to the account processing logic 122 by the recipient as a request for funds, the account processing logic 122 recognizes the transaction using the code and transmits an appropriate amount of funds to the recipient. After the transaction is complete, a SMS confirmation of the transaction may be sent in real time to the mobile device 110.

As another example, a user may use the mobile device 110 to make a payment to an online merchant. In such an embodiment, payment through the payment processing system 100 may be offered to the user as a payment option at checkout. If the user accesses the online merchant through by way of the online community computer system 105, then the user may be authenticated by virtue of having provided username and password information to the online community computer system 105. As another option, rather than the barcode that is generated in step 311 of FIG. 3A, the mobile device 110 may generate a unique code for a transaction which may then be keyed in by the user. Such an arrangement may also be implement to implement payments between members of on-line communities (e.g., MSN®, iPhone® users, Facebook®, LinkedIn®, and so on). In an example embodiment, an application programming interface (API) may be provided for the payment processing system 105 which may be accessed by the online merchant in programming the computer system 140 to accept payments via the payment processing system 105.

In FIG. 3B, a payment is made to another individual (a "person to person" payment). As shown in FIG. 3B, in step 321, a request for a transfer of funds from an individual to another individual is received from the mobile device 110 of the user. The request may include, for example, the other individual's e-mail or phone number or a token. Due to privacy concerns, a person may not want to share their account number with other individuals. However, oftentimes a person is willing to share more publicly available information, such as a name, address, E-mail or a telephone number. By using a combination of the above attributes about an individual, the mobile wallet application 116 can transmit funds or at least a notification to the recipient individual of the request for the fund transfer. The information directory 129 maintains information that correlates such information (i.e., the other individual's e-mail or phone number or a token) with more specific information identifying a mobile wallet account associated with the recipient. Thus, using the information directory 129, the mobile wallet account information of the recipient is identified at step 323. The funds are then transferred to the mobile wallet account of the recipient using the ACH system 150 at step 325. In yet another embodiment, instead of using the recipients phone number or E-mail, the recipient can provide the sender with a token or code for sending funds to the mobile wallet account of the recipient.

In FIG. 3C, the user attempts to make a payment to a recipient that does not have a pre-registered mobile wallet account. As shown in FIG. 3C, in step 331, a request for a transfer of funds from an individual to another individual is received from the mobile device 110 of the user. In step 333, it is determined based on the information directory 129 that the recipient is not a mobile wallet account holder. In step 335, the intended recipient is notified of the attempt to transfer funds, and is prompted to create a mobile wallet account. The notification can be via e-mail, mail or phone, for example. In yet another embodiment, the recipient can request that the funds be delivered to a bank nearby and pick up the funds from the banking institution. The recipient can also choose to provide their bank account information such as routing number and account number. At step 337, the funds are transferred to the recipient from the mobile wallet account 125 using the ACH system 150.

FIG. 4 shows a flow diagram of a payment channel of an example embodiment of the present invention. A consumer 410 can sign up with an online community 412 and set up a mobile wallet account 414. The mobile wallet account 414 is funded from a source account 416 through the ACH system 424, as previously described. Information stored in connection with the mobile wallet account 414 includes information regarding account balance, pending transactions, receipt of payment, and so on. A consumer 410 can use the mobile wallet account 412 to purchase items or services from online merchants 420 and 422, which may have an agreement with the online community provider and be considered to be affiliated. When a transaction is conducted online, the immediate recipient may be the online community provider. The online community provider may then aggregate funds to different merchants received from different members of the online community. The system disclosed in FIG. 4 can be used as a lower-cost alternative payment channel when a consumer is shopping online using either the mobile wallet account 412 or on the Online Community networks. For merchants 420 and 422, receiving payments through the ACH system 424 avoids interchange fees associated with credit card networks.

Figure 5:
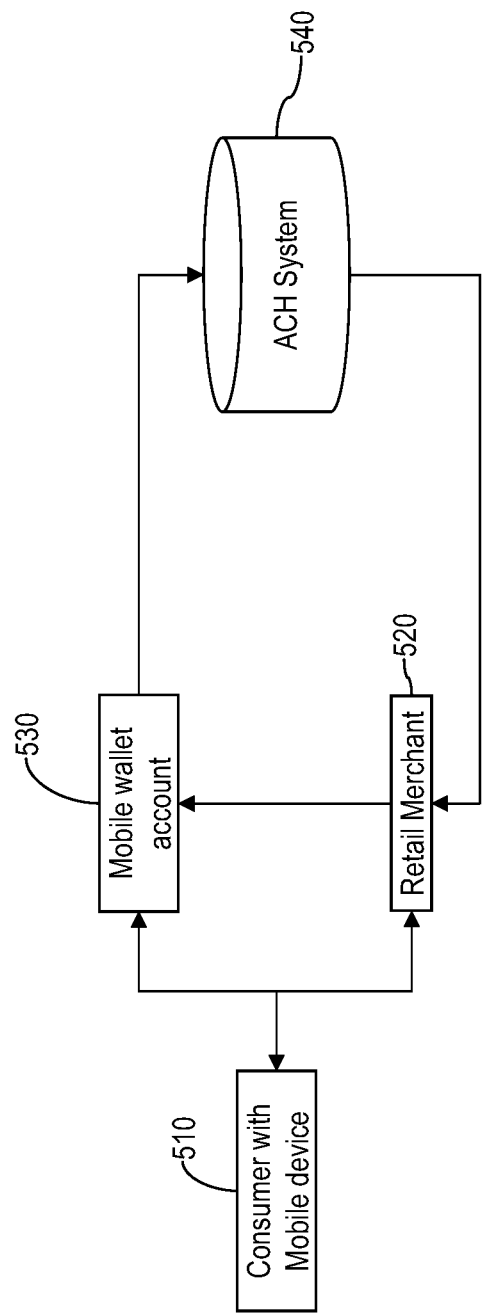
FIG. 5 is a flow diagram showing payment to a retail merchant at the point of sale using a mobile wallet.

FIG. 5 shows a flow diagram of an alternative payment channel that can be used when a consumer with a mobile device 510 with a mobile wallet client application goes to retail merchant 520 to purchase items or services using a mobile wallet account 530. As described above in connection with FIG. 3A, to facilitate this transaction, a code/token generator can create a unique code or token for the retail merchant to scan. The code can be communicated in the form of a scanned bar code, a transmitted radio frequency signal, or in another form. The retail merchant 520 can transmit the unique code to a bank that maintains the mobile wallet account 530. Upon receiving approval for the transaction from the bank, funds are transferred from the mobile wallet account 530 to the retail merchant 520 via the ACH system 540. Transaction costs for the retail merchant 520 are lower because interchange fees associated with credit card networks are avoided.

Figure 6:
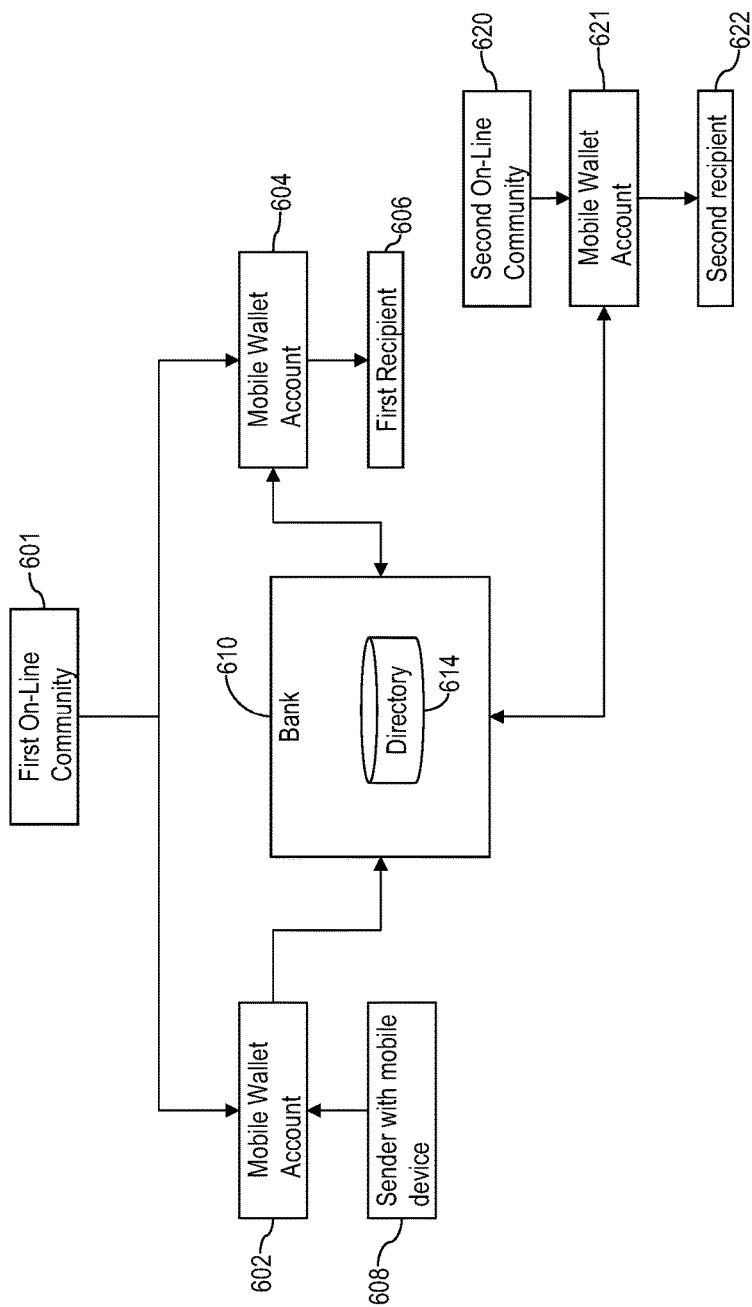
FIG. 6 is a flow diagram showing person to person payment within an online community and with another online community.

FIG. 6 is a flow diagram showing a first example embodiment of how person-to-person payments can be made using mobile wallet accounts. As described above, mobile wallet accounts 602, 604 and 622 may be created through online communities. In the example of FIG. 6, multiple online communities are shown, and payments are made to recipients in each of the online communities. Hence, mobile wallet accounts 602 and 604 are created through a first online community 601, and mobile wallet account 622 is created through a second online community 620. In the example of FIG. 6, the mobile wallet accounts for both the first and second online communities 601 and 620 are maintained by a single bank 610. The bank 610 maintains an information directory 614 that can correlate e-mail, phone number and/or other individual identifying information with a mobile wallet account. This allows the sender to identify a user with name, E-mail, address or phone number and the directory can route the funds to the correct mobile account number. In another embodiment, multiple directories may be maintained and each directory is maintained by a third party, for example, the respective online community provider.

To make a payment to a recipient in the first online community 601, the user selects a contact (for example, a first recipient 606). The first online community 601 receives the above information from the sender and it transmits the recipient identifying information and the amount of funds to be transferred to the bank 610. The bank 610 queries the directory 614 to determine whether the recipient has a mobile wallet account. If the recipient has a mobile wallet account, then the first recipient 606 is notified that funds are being transferred to their mobile wallet account 604. The banking institution 610 can, upon the approval of the first recipient, transfer the funds to holding account of the mobile wallet account 604.

To make a payment to a recipient in the second online community 620, the user selects a contact (for example, a second recipient 622). In this example, the same bank 610 maintains mobile wallet accounts for both the first online community 601 and the second online community 620. The directory 614 therefore has all the information that is needed to complete the transfer and, therefore, the transmission of funds occurs as it did with the first recipient 606. Therefore, the payment processing system 100 may permit two online communities to be joined by allowing transfer of funds to a sender and recipient of different communities. In yet another embodiment, the second recipient 622 has a mobile wallet account 621 that is not maintained by the same bank 610 but instead has a mobile wallet account that is maintained by another bank. In this embodiment, the two banks may provide access to their respective directories for purposes of identifying the sender and the recipient and completing the transaction.

Figure 7:
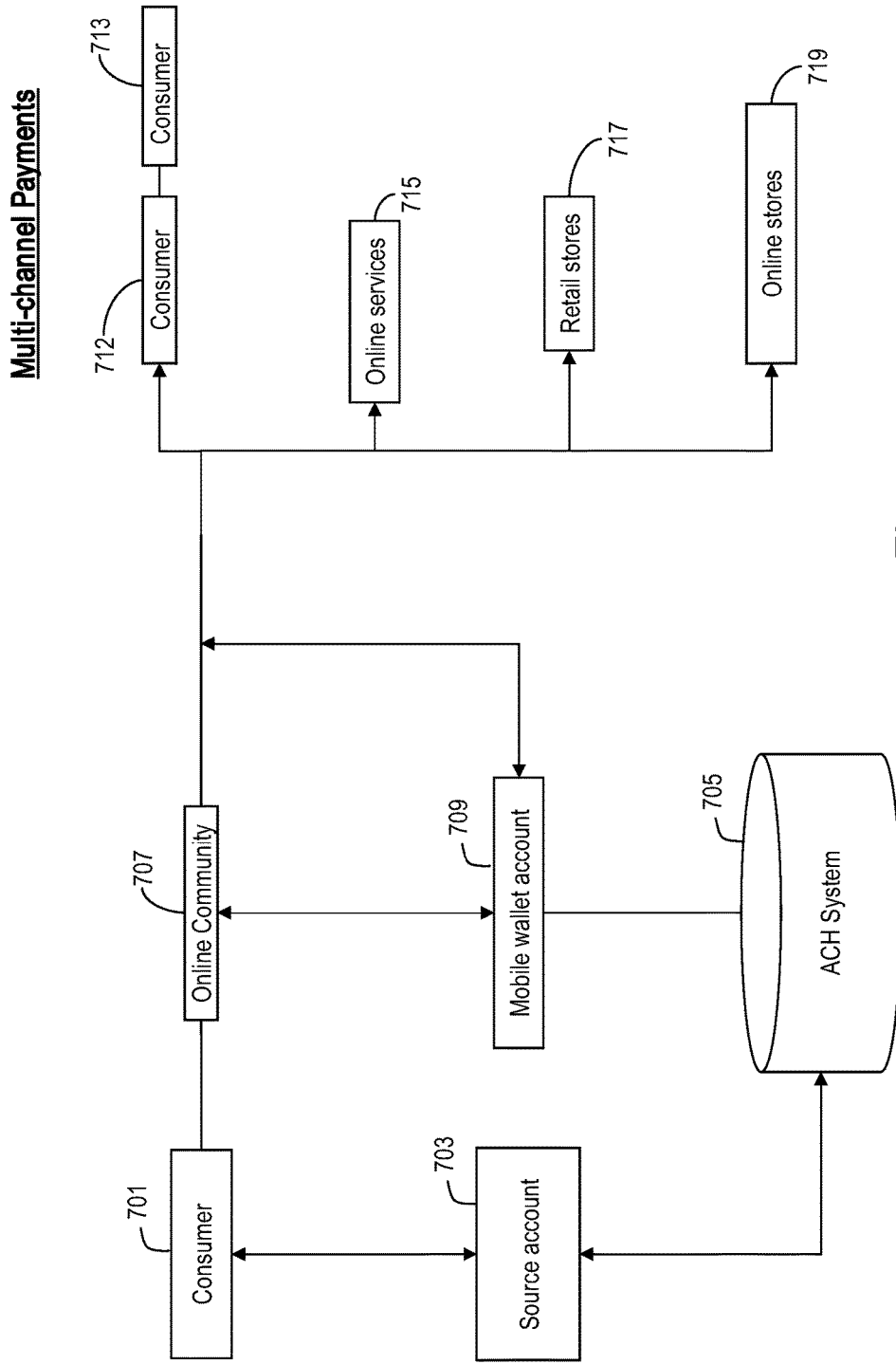
FIG. 7 is a flow diagram indicating multiple channels of payments that may be made using the mobile wallet account as shown in the embodiments of FIGS. 4-6.

FIG. 7 is a flow diagram indicating multiple channels of payments that may be made using the mobile wallet account. In FIG. 7, the consumer 701 is a member of an online community 707 and has a mobile wallet account 709 that uses the ACH system 705. The mobile wallet account 709 may be used to make payments in multiple channels. Thus, as shown in FIG. 7, the consumer 701 can send funds to person-to-person type recipients 712 and 713. As also shown in FIG. 7, the consumer 701 can pay for services that are offered online (e.g., music downloads, movie downloads, subscriptions, etc.) at an online store 715 using the mobile wallet account 711. Additionally, the consumer 701 can pay a retail (bricks and mortar) store 717 for products and services using the mobile wallet account 709. Lastly, a consumer can visit to an online store 719 and pay by using the mobile wallet account 709. Thus, the use of the mobile wallet can greatly reduce the need for carrying a traditional wallet with credit cards.

Figure 8:
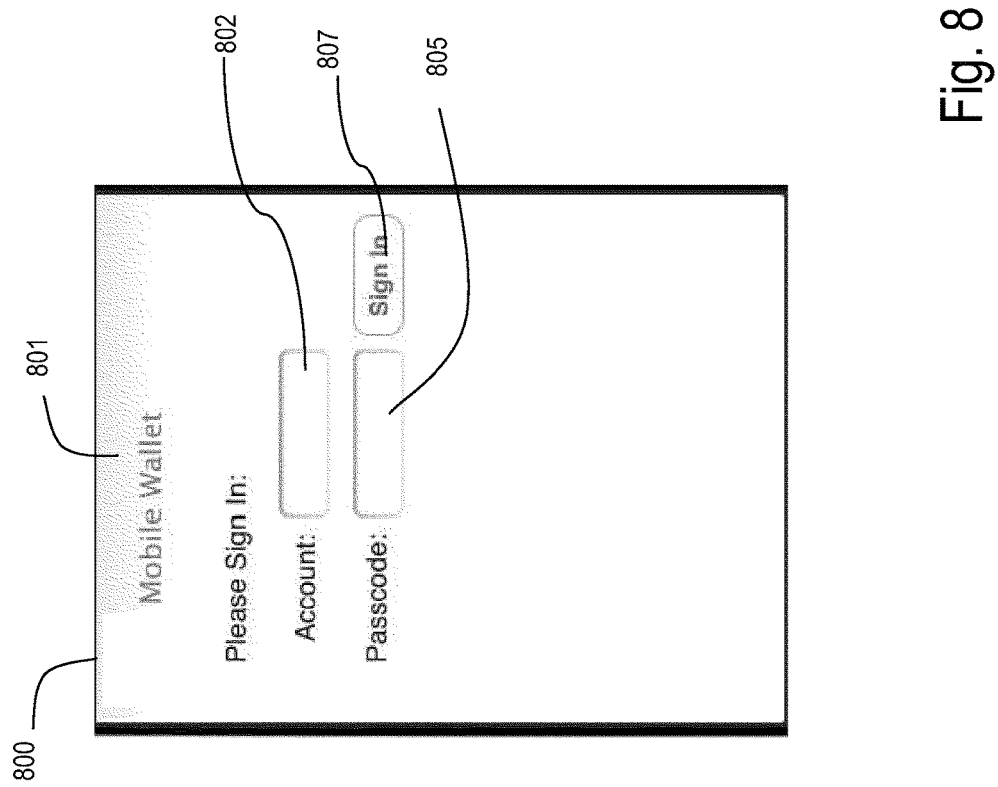
FIG. 8 is a screen shot prompting a user to enter login information for the mobile wallet application on a mobile device of the user.

FIGS. 8-16 show screen displays of a sample mobile wallet client application. In particular, screen 800 as shown in FIG. 8 can be displayed when a user selects the mobile wallet application on their mobile device 110. Screen display 800 identifies to the user that they are signing on to their mobile wallet account in field 801. For signing in, the user may be asked to provide a login ID (e.g., unique account name/number) in field 802 and password in field 805. The account name/number and password may have been configured upon set up of the mobile wallet and/or updated at a later date. As another example, the account name/number and password may be the same as the user's online banking credentials. As another example, assuming that the user is signing on from the mobile device 110, the user may only be asked to provide a pin number (e.g., a 4-digit PIN), given that physical possession of the mobile device 110 may itself provide an additional layer of security. The PIN may be linked to or may be separate from the PIN that is used for a debit card held by the user. After entering the requested information, the user can press the provided sign in button 807.

In other embodiments, other authentication techniques may be used. For example, biometric authentication techniques may be used. For example, a camera on a mobile device 110 may capture an image/video of the user, and a facial recognition algorithm may be used to authenticate the user. As another example, a voice/speech recognition technique may be used. For example, the user may speak into a microphone of the mobile device 110, and the user may be authenticated based on the sound of the user's voice and/or based on the content of the user's speech (e.g., a spoken password). As another example, the mobile device 110 may be provided with a fingerprint scanner, and a finger print authentication technique may be used.

Figure 9:
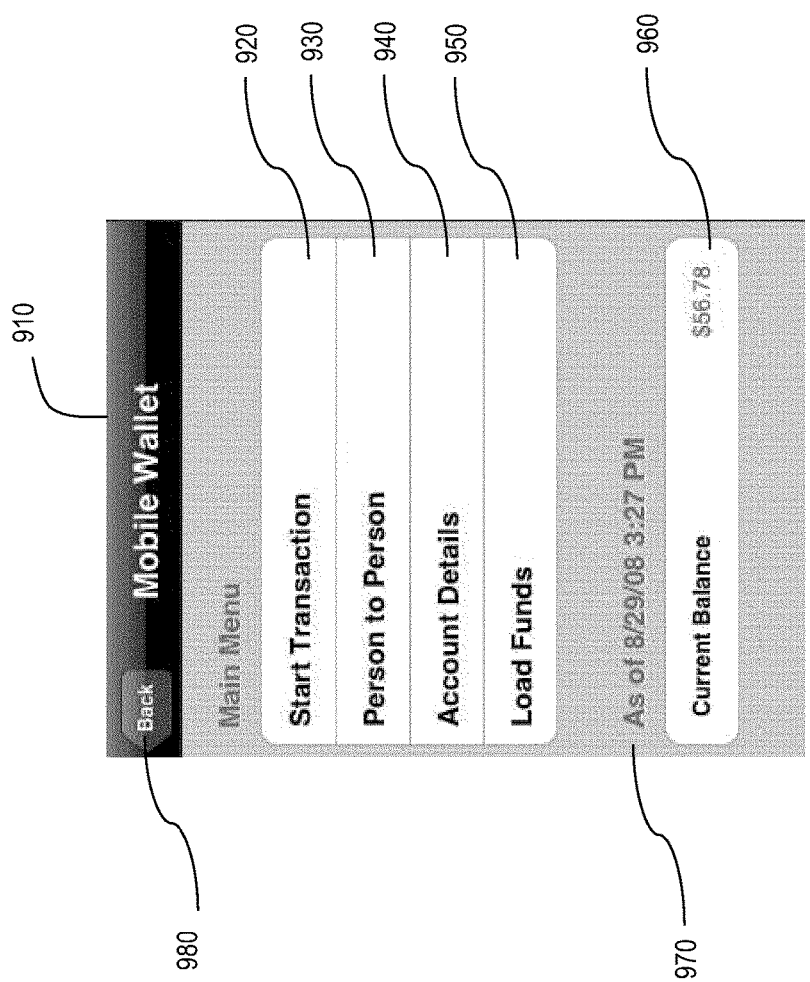
FIG. 9 is a screen shot showing a first menu in the mobile wallet application.

Next, after the user has been authenticated, information on the screen 910 shown on FIG. 9 can be displayed on the mobile device 110. In FIG. 9, the user is given a menu with various menu items including a start transactions button 920, a person to person button 930, an account details button 940, and a load funds button 950. The start transaction button 920 allows the user begin a purchase transaction (online or retail) using the mobile wallet account 125. The person to person button 930 allows a user to initiate a transfer from funds from the user to a recipient as described above with reference to FIGS. 1 and 6. The account detail button 940 provides the user with details regarding the balance and prior transactions. The load funds button 950 allows the user to load funds onto the mobile wallet account 125 using an ACH system 150 as described above. Finally, screen 910 displays the current balance 960 for the account for a particular date and time as indicated in field 970.

Figure 10:
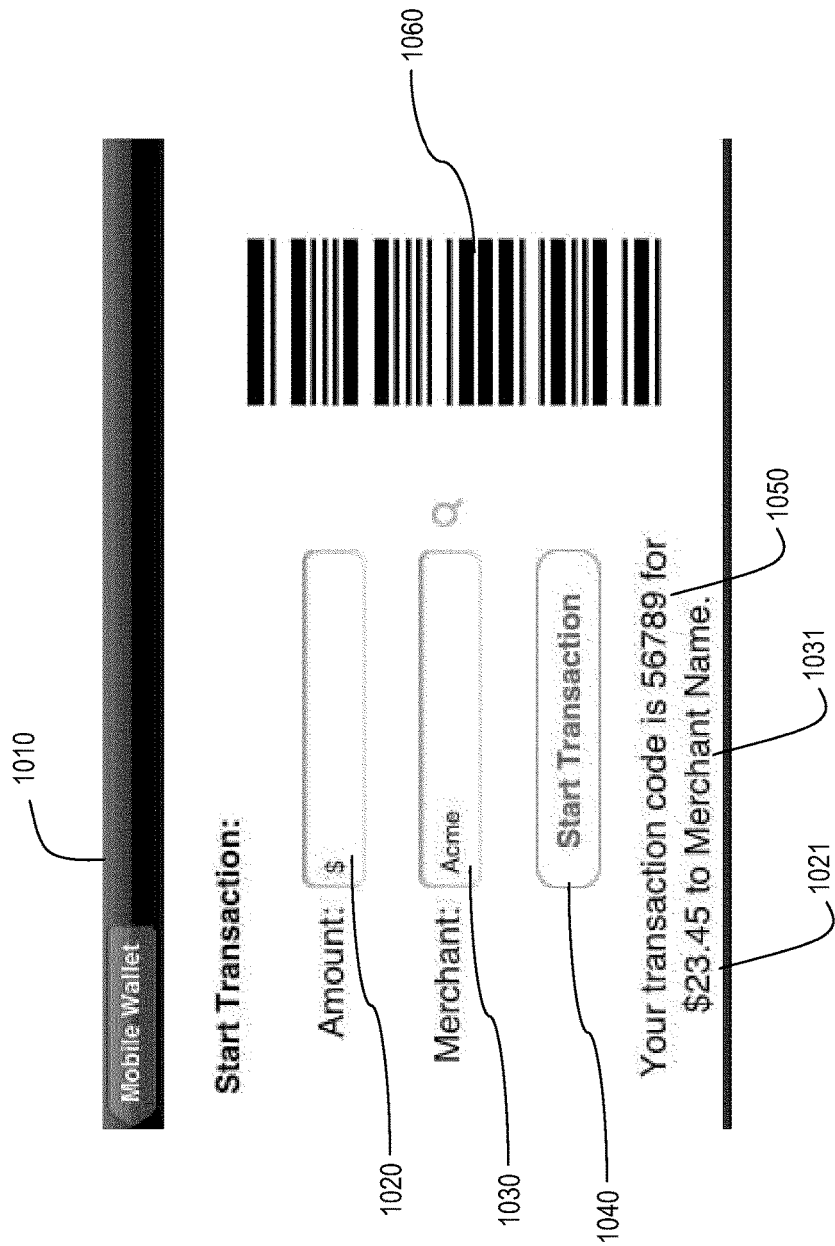
FIG. 10 is a screen shot showing a start transaction portion of the mobile wallet application.

After receiving a selection of the start transaction button 920 in FIG. 9, screen 1010 in FIG. 10 is displayed. The user can enter the amount of the transaction in the text filed 1020. Also, the user can enter a merchant name or search for the merchant. After entering the merchant name and amount and clicking the start transaction button 1040, a transaction code 1050 is displayed with the amount of the transaction and the merchant name. Moreover, as shown on screen 1010, a bar code 1060 is displayed for a merchant to scan. The bar code is uniquely generated for the transaction and encodes information such as the amount of the transaction, the account number of the mobile wallet account of the user, and so on.

Figure 11:
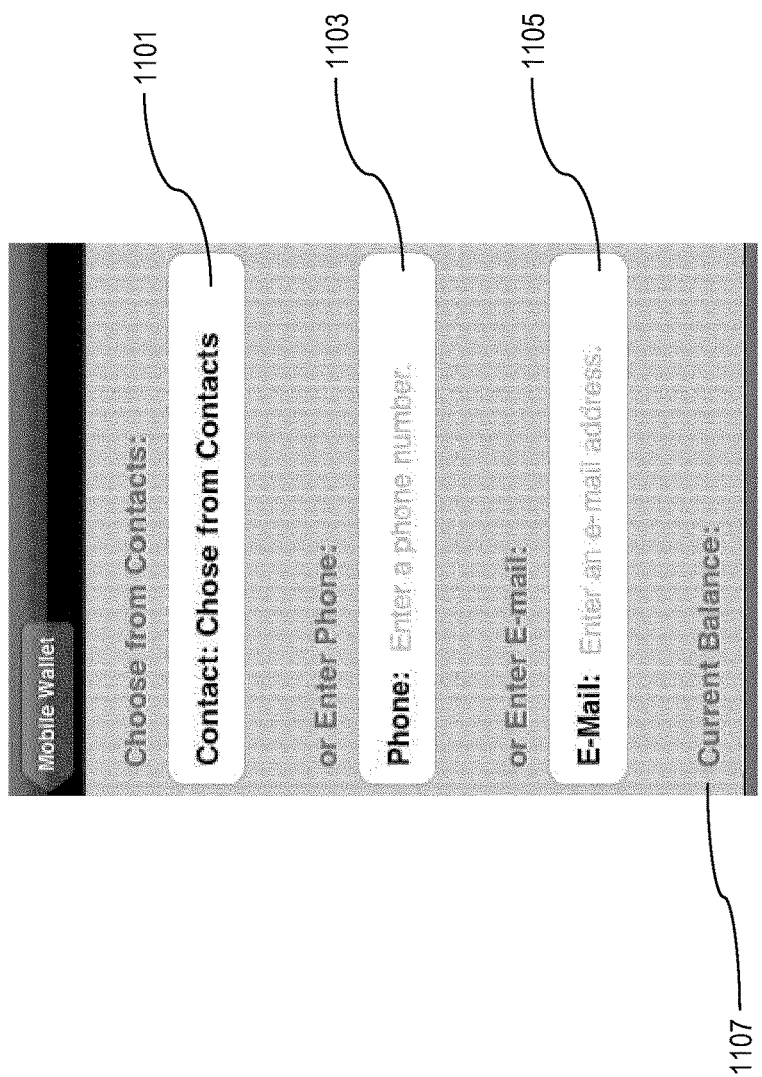
FIG. 11 is a screen shot prompting the user to enter information regarding an individual recipient.

If the user chooses the person to person button 930 in FIG. 9, then the screen display of FIG. 11 can be shown on the mobile device. The user can enter the contact name or search for a contact name in the field 1101. Alternatively, the user can enter or search for a phone number in field 1103. As another alternative, the user can enter or search for the e-mail address of the recipient in field 1105. Also, prior to transferring funds to a person, the current balance of the holding account is displayed in field 1107 on the screen display of FIG. 11.

Figure 12:
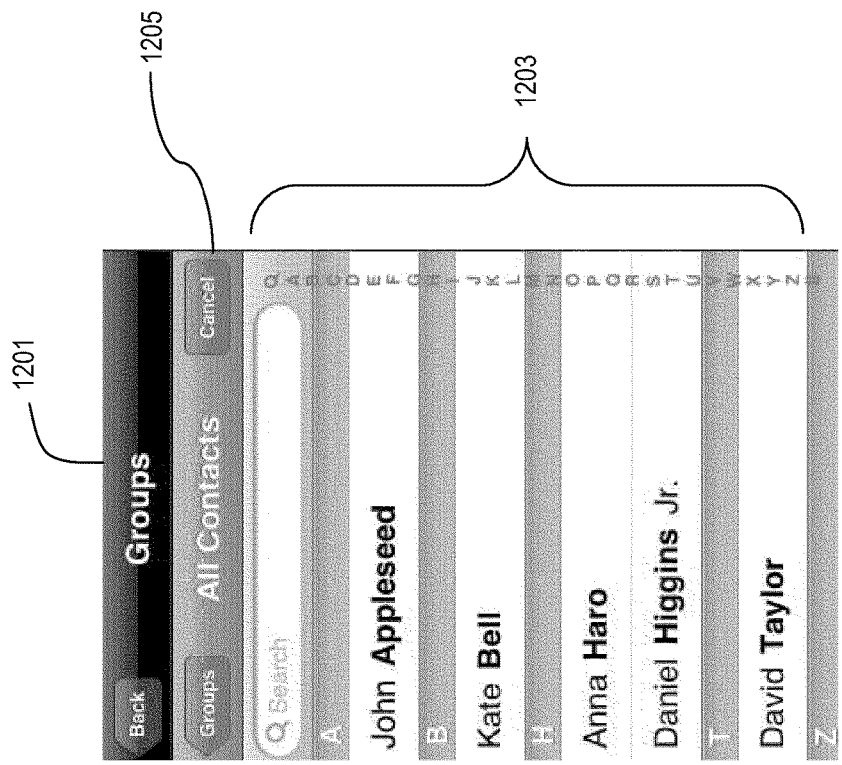
FIG. 12 is a screen shot prompting the user to select a recipient from a list of contacts.

FIG. 12 is the screen display shown to the user if the user chooses to search for a contact in the users address book on the mobile device. As shown in the screen display of FIG. 12, a user can display contact in groups or all contacts 1203. This screen allows the user to choose a contact to send funds to.

Figure 13:
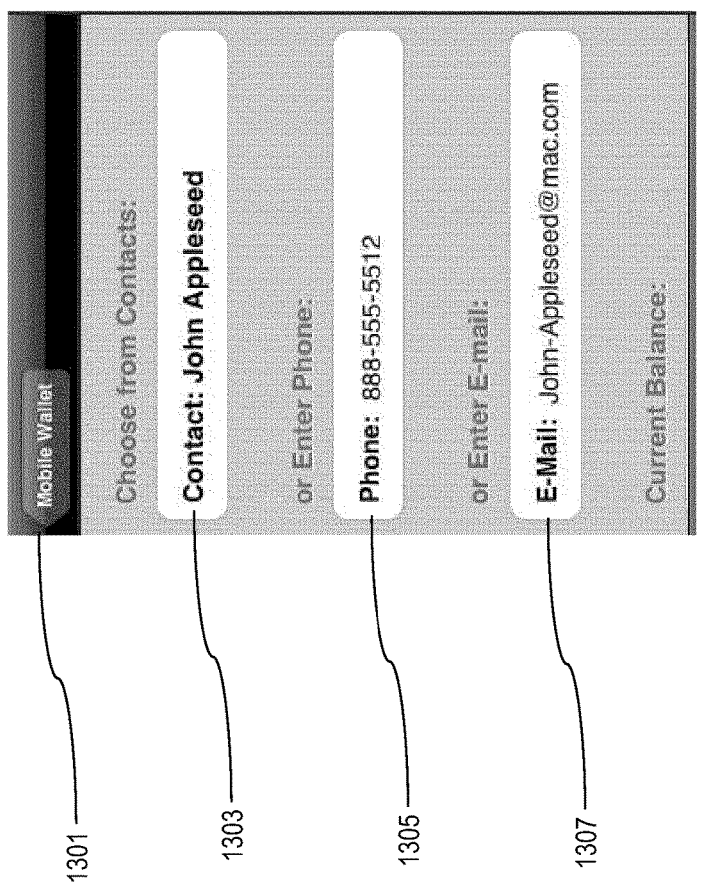
FIG. 13 is a screen shot showing the user choosing an example contact information for "John Appleseed".

FIG. 13 is a screen display shown if the user chooses an example contact "John Appleseed" in FIG. 12. The name of the selected contact is displayed in field 1303. If the user's address book has the phone number and e-mail address for the recipient, then that information is displayed on the screen in fields 1305 and 1307, respectively. By pressing the mobile wallet button 1301, the user can to go the screen that requests the amount of money to send to the selected contact (John Appleseed in the illustrated example).

Figure 14:
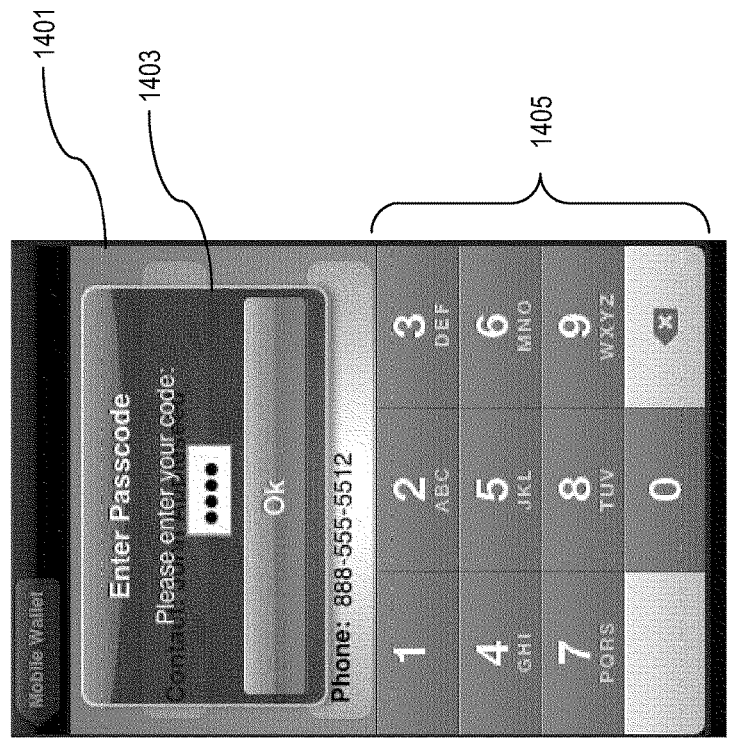
FIG. 14 is a screen shot prompting the user to user enter a numerical passcode.

FIG. 14 is a screen display prompting the user to enter a passcode 1403 prior to sending funds or finalizing a transaction. To enter the numerical passcode the user is provided with keys 1405. The passcode may be the same passcode as entered in connection with FIG. 8, or may be a different passcode to provide a heightened level of security.

Figure 15:
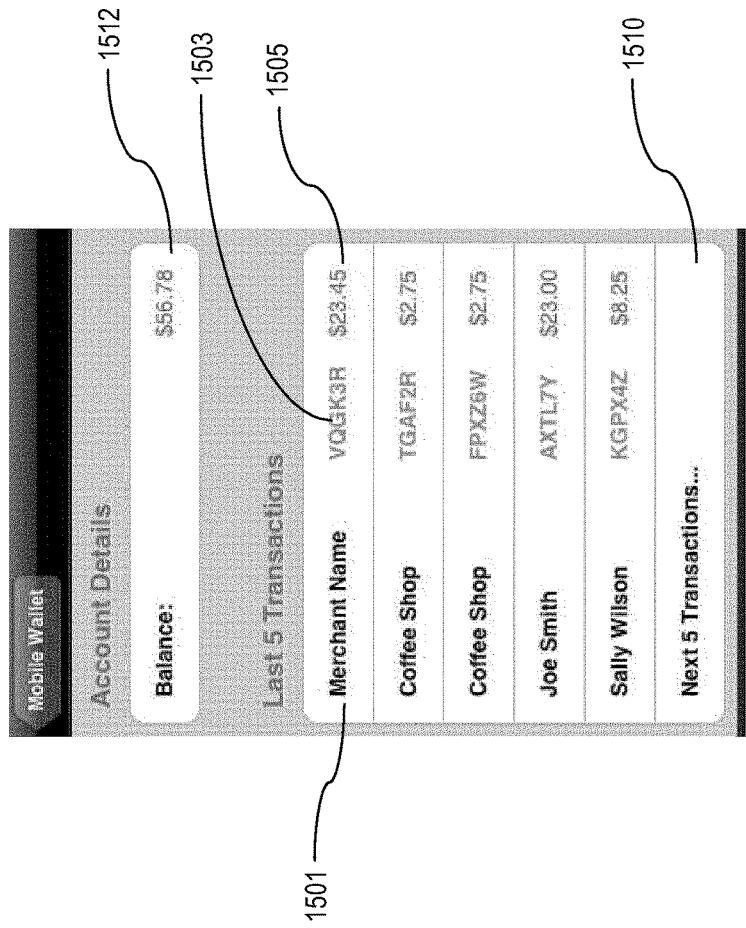
FIG. 15 is a screen shot showing the account details from FIG. 9.

FIG. 15 is displayed when the user chooses to view the account details button in FIG. 9. The screen display in FIG. 15 shows a balance 1512 and the details regarding the last five transactions. The user can press button 1510 and see the next five previous transactions. The screen displays the name of the recipient 1501, the transaction code 1503 and the amount of the transaction 1505. Thus, a user can view their spending by simply looking it up on their mobile device 10 since the mobile device 10 displays balance information and transaction detail information for prior transactions.

Figure 16:
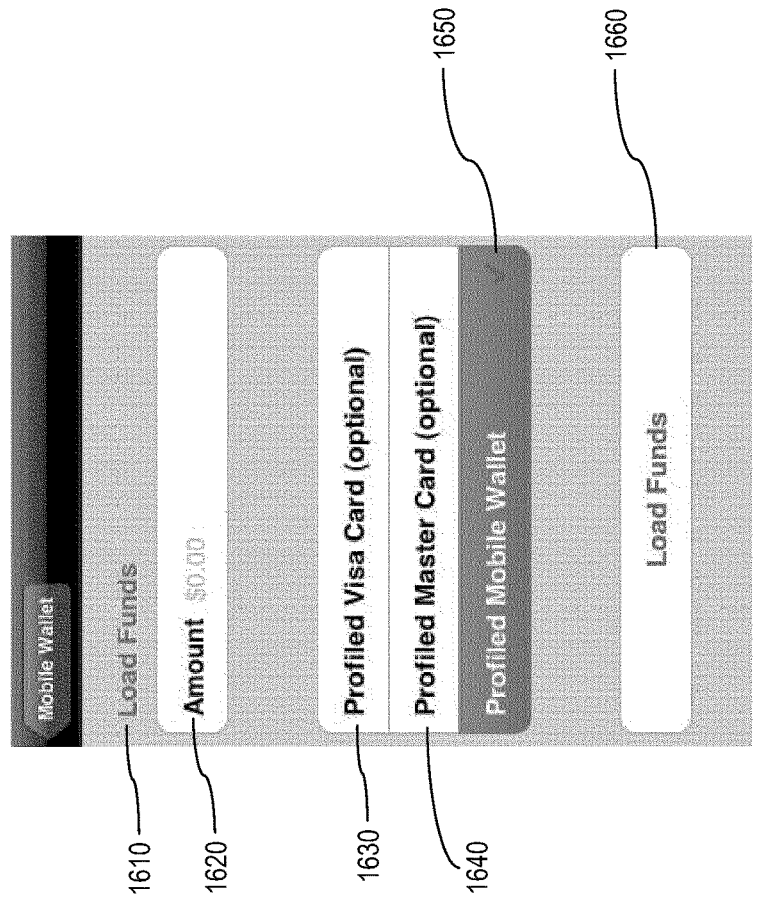
FIG. 16 is a screen shot prompting the user to load funds into the mobile wallet account.

FIG. 16 is displayed if the user chooses the load funds button in FIG. 9. The user is provided a text field 1620 to enter the amount to be loaded. After making the selection the user must click on the load funds button 1660. After clicking on load funds button 1660, the funds are loaded and made available to be used for transactions. As shown in FIG. 16, in addition to using a profiled mobile wallet account, as shown in field 1650, the mobile device 10 may also use other profiled accounts to make payments as shown in fields 1630 and 1640.

Referring now to FIGS. 17-27, another embodiment of a computer-implemented payment processing system is shown. Payment processing system 1700 may be used by a user or account holder to set up and utilize a mobile wallet account. The user may be a business entity and/or an individual consumer that has one or more source accounts with a financial institution. The source accounts may include business or consumer accounts. The mobile wallet account can be created for the user to transmit funds to a merchant in return for purchase of goods or services. Additionally, funds can be transferred from the mobile wallet account to another person.

Payment processing system 1700 may include, among other systems, a mobile device 110, merchant computer system 140, mobile wallet bank computer system 120, source account bank computer system 130 and payment system 150. Systems 110-150 may be implemented as described above in connection with FIGS. 1-16. Further, to the extent such structures are not already provided in the arrangement of FIGS. 1-16, systems 110-150 as shown in FIGS. 17-27 may further include additional structures to perform additional operations as described below.

Figure 17:
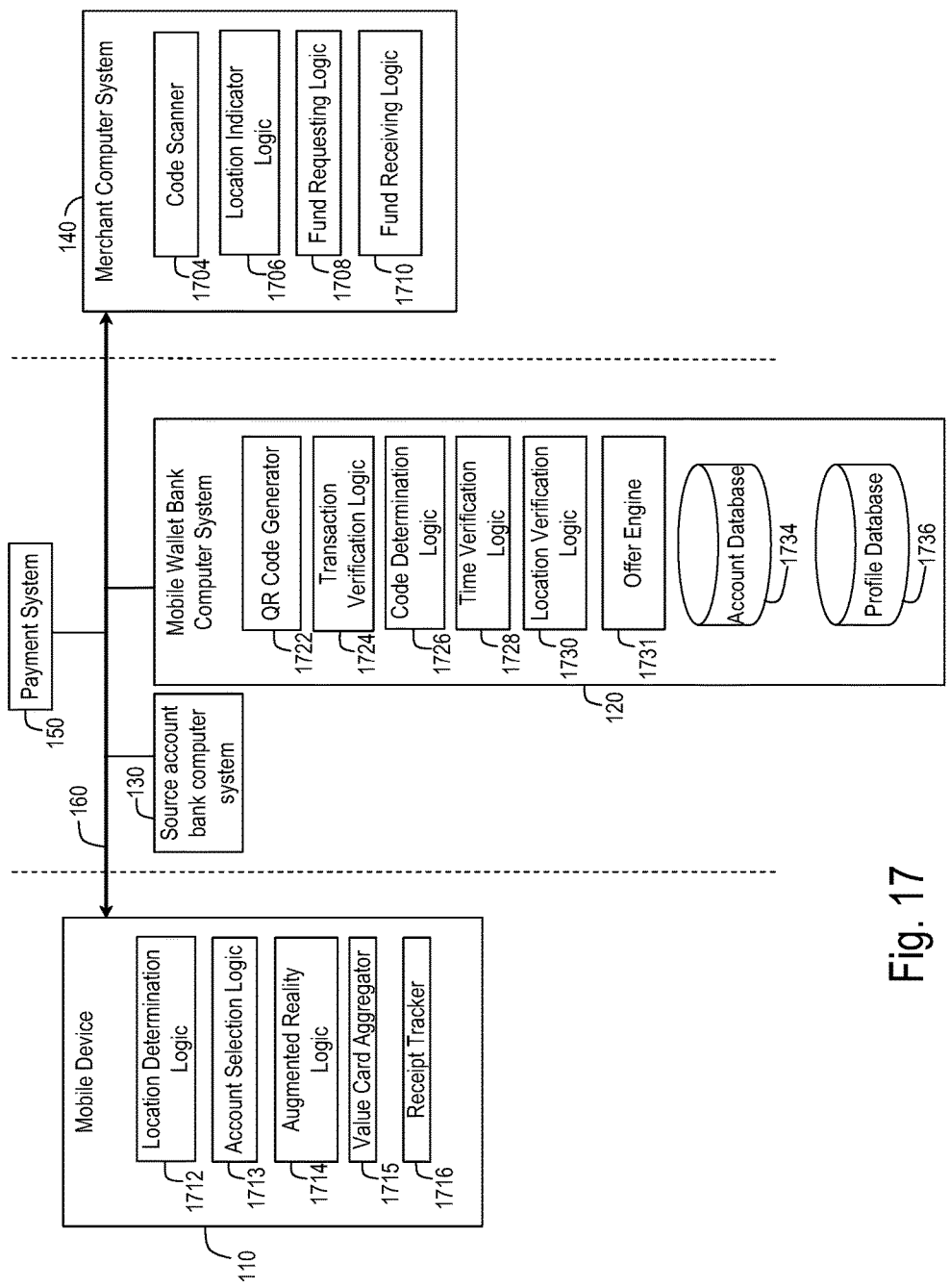
FIG. 17 is a schematic diagram of a computer-implemented payment processing system according to an example embodiment.

In the arrangement of FIG. 17, the mobile device 110 further comprises location determination logic 1712, account selection logic 1713, augmented reality logic 1714, gift card aggregator 1715, and receipt tracker 1716. The location determination logic 1712 determines the location of the mobile device 110 for use by the mobile wallet application 116. A user may opt-in to using the location determination logic to provide enhanced protection against fraudulent transactions, as described below. The location determination logic 1712 may use a satellite (GPS) sensor or cellular towers to determine the location coordinates of the mobile device 110.

The account selection logic 1713 allows a user to choose any one of the accounts to transfer funds to the merchant for goods or services. An account holder may select a default account that is used to make payments. The account holder may use the account selection logic 1713 to select the account the account holder wants to use to pay the merchant or other recipient.

The augmented reality logic 1714 may be configured to generate sensory outputs such as sound, video, graphics or GPS data that augment the image that is displayed on the mobile device. The augmented reality logic 1714 is configured to receive image data from a mobile device camera or image scanner and augment the image with additional information, as described below.

The value card aggregator 1715 may be configured to add or subtract balances of stored value cards that are currently owned by the account holder. The value card aggregator 1715 may also provide the account holder with the ability to manage (e.g., add, edit, delete, and so on) value cards in the mobile wallet. In one embodiment, the value card may be a merchant-issued card with a balance that represents a specific amount of funds. The value card aggregator 1715 may receive as input from the image scanner or camera of the mobile device a scanned bar code from a stored value card. In one embodiment, the stored value card may be a physical card that is owned by an account holder. In another embodiment, the stored value card may be a virtual card that has an identification number and a value. A virtual card can be a debit card, credit card that is issued without any corresponding physical (e.g. plastic) card. The funds associated with the virtual card can be accessed without a physical card. In one embodiment, the value card aggregator 1715 is configured to store value information with respect to a plurality of different value card issuers. For example, the value card information regarding various value card issuers may be saved in a single mobile wallet application on a single mobile device 110.

The receipt tracker 1716 may be used by the account holder to track receipts received in connection with mobile wallet transactions. In one embodiment, the bank computer system 120 may transmits receipts to the mobile wallet application 116 on mobile device 110 for viewing. The receipts may be sent from the merchant computer system 140 to the bank computer system 120 upon completion of a transaction. As described in greater detail below, the receipt tracker 120 may provide various tools to the user of the mobile device 110. For example, the receipt tracker 1716 may be configured to generate a display informing the user regarding how much money the user has saved using the loyalty card. The receipt tracker 1716 may receive geographical location information regarding where the funds from a receipt were spent (e.g., for purposes of searching receipts, generating expense reports, and so on). The receipt tracker 1716 may generate a display that shows the data regarding geographical location information on a map for an account holder to display.

The merchant computer system 140 may be used at a point of sale to conduct transaction with the account holder. For example, the merchant computer system 140 may comprise a point of sale computer system such as a cash register system connected to a central server system operated by the merchant. As another example, the merchant computer system 140 may comprise a mobile computing device (e.g., smart phone, tablet PC, etc.) operated by a store clerk as the clerk moves throughout the store. Again, the mobile computing device in such an embodiment may connect to a central server system operated by the merchant.

The merchant computer system 140 includes code scanner 1704, location indicator logic 1706, fund requesting logic 1708, and fund receiving logic 1710. In one embodiment, the network interface logic 1702 is configured to allow the merchant computer system 140 to communicate with network 140. The network interface logic 1702 sends and receives data from mobile device 110 and bank computer system 120.

The code scanner 1704 may be configured to scan codes, such as but not limited to, optically scanned or non-optically scanned codes. Examples of optically scanned codes include bar codes, two dimensional codes (e.g. QR code and other similar codes), three dimensional codes (e.g. QR code with color and others characteristics), and four dimensional codes (e.g. QR code with color and timestamp information). Examples of non-optical codes include, near field communication (NFC), RFID, HID or other RF signal to transmit the code. Code scanner 1704 may include a light emitting device that scans a code using infrared, laser, or other types of communication technology. After scanning the QR code the QR code scanner 1704 determines the information that was incorporated into the QR code by the mobile device 110 that generated the code.

The location indicator logic 1706 provides an indication of the geographic location of the code scanner 1704. In one embodiment, the location indicator logic 1706 may be programmed with the known address of the merchant location as the location of the QR code scanner.

The fund requesting logic 1708 communicates a fund request via the network interface logic 1702 to the bank computer system 120. The fund requesting logic 1708 sends the location of the code scanner 1704 to the bank computer system 120. In one embodiment, the fund requesting logic 1708 also sends the amount of transaction to the financial transaction.

The merchant computer system 140 may further connect to or integrate with other hardware. For example, in one embodiment, the merchant computer system 140 may connect to a card reader for reading credit cards, debit cards, stored value cards, and so on. As another example, the merchant computer system 140 may be configured to prompt the user to provide a random security code. The random security code may be generated by the mobile device 110, by a separate security dongle, or in another manner. The security code may be provided to the merchant computer system 140 directly by the mobile device, may be keyed into the merchant computer system (e.g., by a store clerk), or may be received in another manner.

In FIG. 17, the mobile wallet application 116 is used in connection with merchant computer system 140 located at a bricks and mortar store location. As previously indicated, however, the mobile wallet application 116 may also be used in connection with online merchant transactions. For example, in another embodiment, merchants may be provided with the ability to have a mobile storefront and profile within the mobile wallet application 116. For example, merchants may be provided with the ability to display marketing material, provide information, and promote products or discounts. Merchants may also be provided with the ability to sell items directly through their mobile storefront for the account holder to purchase from within the mobile application 116.

As also previously indicated, the mobile wallet application 116 may also be used in connection with non-merchant transactions. For example, in another embodiment, the mobile wallet application 116 may be configured to send payments to organizations that are able to accept donations under 26 U.S.C. § 501(c)(3) (e.g., religious organizations, educational organizations, charitable organizations, scientific organizations, literary organizations, public safety testing organizations, organizations that foster national or international amateur sports competition, organizations that promote prevention of cruelty to children or animals, and so on).

The bank computer system 120 includes network interface logic 1722, transaction verification logic 1724, code determination logic 1726, time verification logic 1728, location verification logic 1730, account database 1734, and profile database 1736. The code generator 1722 may receive a request from an account holder to initiate a transaction. A transaction may be initiated by generating a QR code that can be scanned by a merchant or individual. The account holder may access the code generator 1722 via a mobile wallet application that is being executed on the mobile device 110. In various embodiments, the QR code may be generated without the account holder providing the merchant's name or amount of transaction. The code generator 1722 can be configured to generate a QR code that incorporates at least one of a date, time, unique transaction identifier, and geographic location of the mobile device. In other embodiments, the code generators 118 and 1722 can be configured to generate optically scanned or non-optically scanned codes. Examples of optically scanned codes include bar codes, two dimensional codes (e.g. QR code and other similar codes), three dimensional codes (e.g. QR code with color and others characteristics), and four dimensional codes (e.g. QR code with color and timestamp information).

Examples of non-optically scanned codes may include, near field communication (NFC), RFID, HID or other RF signal to transmit the code.

In another embodiment, the code generator 1722 may receive a request for a code to provide to a merchant, the code being generated to be displayed on a merchant point of sale machine or an ecommerce website. The merchant may display the code for the account holder to scan using a mobile device. Generating the code including embedding in the code a transaction identification number, a geographic location of the merchant, and a timestamp. The financial institution may send the code to the merchant for the mobile device to scan. The mobile device 110 may scan the code from a merchant display device. The mobile device 110 may amend the code to add a further authentication information to the code and send the code to the financial institution. The financial institution may receive the amended code from the mobile device to transfer funds from an account held by the account holder to the merchant. In one embodiment, the requested funds are transferred to the merchant upon verifying the geographic location of the mobile device to be within a predetermined distance of the location of the merchant. In another embodiment, the amended code is amended to include authentication information (e.g. geographic location, account number, pass code, pin code) from the mobile device for the financial institution.

The transaction verification logic 1724 may receive a transaction amount from the merchant computer system 140. The transaction verification logic 1724 may generate a message to send to the mobile device 110 for verifying the transaction amount. Upon receiving the verification message, the account holder via mobile device 110 may approve the transaction amount to the bank computer system 120.

The time verification logic 1728 includes a comparator configured to compare the time provided by the merchant computer system 140 with the time provided via the QR code generated by the mobile device 110. If the time provided by the QR code and the merchant computer system 140 does not match within a predetermined time limit (e.g., five minutes), the bank computer system 120 will deny the transaction.

The location verification logic 1730 includes a comparator configured to compare two geographic locations. In one embodiment, the GPS location that is encoded with the QR code may be compared to the location provided by the location indicator logic 1706 at the merchant computer system 140. As described in greater detail below, if locations provided by the mobile device 110 and the merchant computer system 140 are within a predetermined distance of each other, then the payment from the mobile wallet may be approved.

The offer engine 1731 may be configured to receive past financial transaction information regarding transactions conducted by the account holder. For example, the account holder may opt in to receive offers that are selected as being likely to be considered relevant or helpful by the account holder. As described in greater detail below, the transaction information may be analyzed to obtain information regarding stores that the account holder frequently visits, the amount of money the account holder typically spends at various types of stores, the monthly spending habits of the account holder, the timing of income payments received by the account holder, seasonal spending patterns of the account holder, and so on. In another embodiment, the offer engine 1731 may download new updated offers based on the account holder's geographic location from the merchant computer system 140.

In another embodiment, the offer engine 1731 is configured to present offers, in the form of an alert, to an account holder based on the account holder's geographic location. For example, when an account holder is within a geographic perimeter around a predetermined location (e.g. merchant, service provider, entertainment venue, etc.) the offer engine 1731 may generate a message that is displayable on the display 114 as an alert. The message may display the approximate geographic distance to the predetermined location where the offer may be redeemed and the details regarding the offer. The details regarding the offer may include the item or service that is being offered at a discounted price and/or the amount of money the redemption of the offer may save the account holder. As part of displaying the alert, an overlay display may also be generated, possibly accompanied by a vibration and/or sound generated while the account holder's device is in sleep or active use mode.

The account database 1734 may store details regarding financial institution accounts. In particular, the account database 1734 may store each financial transaction that occurred. Each financial transaction may include the amount of the transaction and the merchant. In one embodiment, the receipt tracker 1716 may request information from account database 1734.

The profile database 1736 may store other information regarding the account holder. For example, the profile database 1736 may store information useful for generating offers and advertising that are selected specifically for the account holder, as described in greater detail below.

Figure 18:
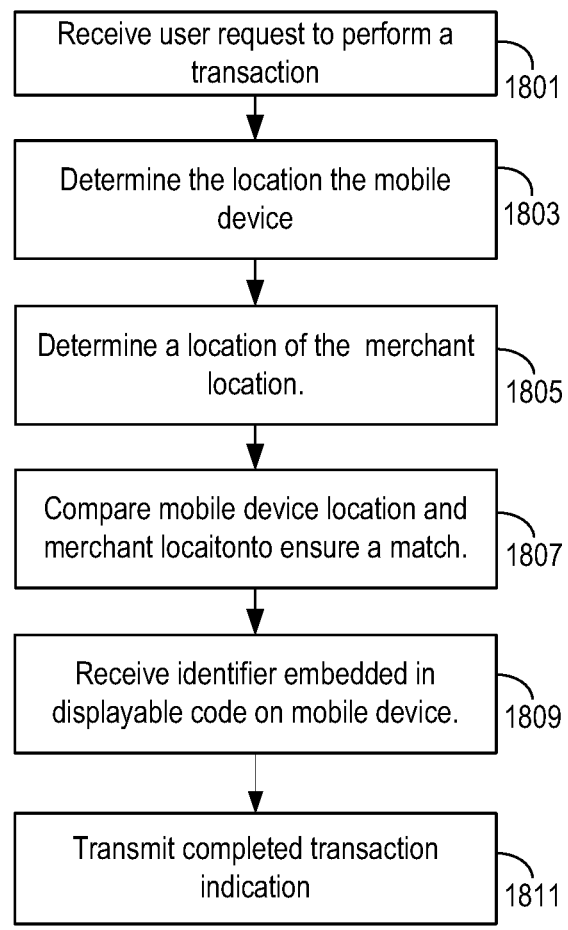
FIG. 18 is a process implemented by the payment processing system of FIG. 17.

FIG. 18 is a process implemented by the payment processing system of FIG. 17. The process from FIG. 18 includes blocks 1801, 1803, 1805, 1807, 1807 and 1811. Block 1801 includes receiving a user's request to perform a financial transaction. The transaction may include a sale of a good or services. The user's request to perform a financial transaction may initially be received by the mobile device 110. In one embodiment, the mobile device 110 receives the request to perform a transaction after the user selects a mobile wallet application on the mobile device 110. The request may then be transmitted from the mobile device 110 and received at the mobile wallet bank computer system 120. The user's request to perform a financial transaction may also be received by the merchant computer system 140 (e.g., by virtue of a store clerk beginning to ring up a purchase transaction).

At block 1803, the geographic location of the mobile device 110 is determined. As previously indicated, the location determination logic 1712 in the mobile device 110 may use a satellite (GPS) sensor or cellular towers to determine the location coordinates of the mobile device 110. The location of the mobile device 110 may be transmitted to the bank computer system 120 as part of the transaction request.

Upon receiving the request, the bank computer system 120 generates a transaction code that may be used to identify the transaction. The code may comprise a unique identifier for the transaction. The code may also embed the date and time the transaction request was received and the location of the mobile device 110. The transaction code is transmitted to the mobile device 110. The transaction code may be displayed on the mobile device 110 and scanned by the code scanner 1704. For example, the transaction code may be implemented as a QR code which is readable by the code scanner 1704. The information that is embedded in the transaction code may be extracted from the code at the merchant computer system 140, such as the date, time, the location of the user, and the unique transaction identifier. In another embodiment, the code is generated by the merchant computer system 140 and scanned by the mobile device 110 (e.g., using a camera built into the mobile device).

Next, at block 1805 the location of the merchant may be determined. For example, the address or other location information may be retrieved from the location indicator logic 1706. At block 1807, the location of mobile device 110 and the location of the merchant are compared to ensure a match. Ensuring that the mobile device 110 is at the same location as the merchant computer system 140 helps prevent fraudulent transactions. In one embodiment, a match is ensured by determining the distance between the two locations and ensuring that the distance is within a predetermined distance. For example, the predetermined distance may be up to 50, 100, 200 feet or another distance. In one embodiment, the location of the merchant computer system 140 is transmitted to the bank computer system 120 and the comparison is performed at the bank computer system 120. In such an embodiment, the bank computer system 120 determines the location of the mobile device 110 and the location of the merchant computer system 140 using location information provided by each, and performs the comparison on the basis of such location information. In another embodiment, the comparison is performed at the merchant computer system 140. The comparison may also be performed at both locations. In another embodiment, the location of the mobile device 110 and the location of the merchant are compared before a transaction code is generated and, if the mobile device is not at the same location as the merchant computer system, then the transaction code is not generated. A similar comparison may also be performed in connection with the date and time information (e.g., to ensure that the transaction request from the mobile device 110 is not expired or too old to be valid).

In another embodiment, in addition to ascertaining whether the mobile device 110 is at the same location as the merchant computer system 140, it is also ascertained whether the mobile device is inside/outside a predetermined geographic region. For example, it may be ascertained whether the mobile device is outside the United States. For example, if it is known that merchant X has no store locations outside the United States, and if the mobile device 110 is outside the United States, then the transaction may be denied. This may provide a second, independent test of the user's location to ensure that the transaction does not appear fraudulent. As another example, it may be ascertained whether the mobile device is within one or more specified foreign countries. The location of the mobile device 110 may be determined and checked when the transaction is initiated and at multiple times throughout the transaction to guard against spoofing attacks.

At block 1809, the merchant computer system 140 sends transaction information to the bank computer system 120. For example, the amount of the purchase, the unique identifier, the date and time, and the location information may be sent to the extent such information has not already been transmitted. The bank computer system 120 may use this information to transfer funds from the mobile wallet account to an account of the merchant. For example, in one embodiment, the bank computer system 120 uses the unique identifier to retrieve information previously stored about the transaction (e.g., account information for the mobile wallet account) when the transaction was first initiated. On this basis, information may be passed back to the merchant computer system 140 to permit the transaction to be completed. For example, a credit card number or ATM card number associated with the mobile wallet account may be passed back to the merchant computer system 140 (or to other backend computing systems of the merchant), thereby allowing the merchant to process the transaction in the same way other credit card and ATM card transactions are processed. As another example, the merchant computer system 140 may also include logic to connect to a third-party payment service, e.g., to a service that performs credit card processing for merchants that do not otherwise accept credit cards. It may be noted that the account holder may not need to enter the merchant name or the amount of the transaction into the mobile wallet application 116, as this information may be provided by the merchant.

At block 1811, an indication that the transaction has been completed is transmitted. As described above, the transaction is completed based on the unique identifier and based on the match of the first and second location. For example, when the merchant computer system 140 completes backend processing of the transaction, an indication that the transaction has been completed may be transmitted to the mobile device 110 and/or the bank computer system 120. In turn, the mobile device 110 may transmit an indication that the transaction has been completed, e.g., by generating a confirmation screen that is displayed to the user. The bank computer system 140 may also transmit the indication to other backend processes.

In another embodiment, rather than transmitting the actual sixteen digit number of a valid credit or debit card back to the merchant computer system 140, a tokenized sixteen digit number is transmitted. This sixteen digit number may have a unique BIN (e.g., the first four digits of the original card number) and the same last four digits as the original card number. The middle six digits may be variable and produced for each transaction. When the bank that issued the credit card receives the tokenized sixteen digit number (after it passed through the normal four party system of merchant to acquiring bank to issuing bank to consumer), the tokenized sixteen digit number may be decoded and replaced by the original number in order to fund the purchase. The tokenized sixteen digit number may be transmitted in accordance with the 18092 NFC ISO standard.

Figure 19A:
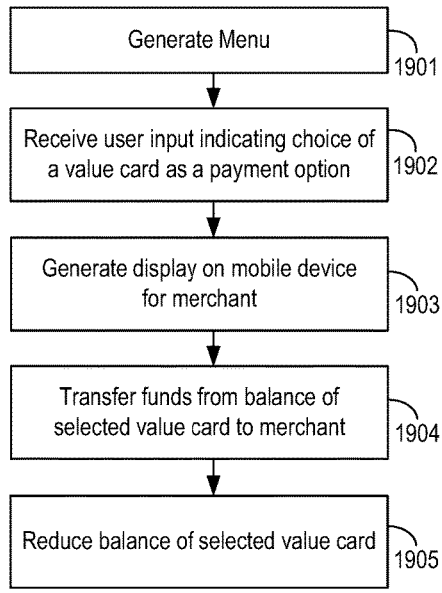
FIG. 19a is a process implemented by the payment processing system of FIG. 17.

FIG. 19*a* is a process implemented by the payment processing system of FIG. 17 in connection with processing payment from a stored value card. The process from FIG. 19*a* includes blocks 1901, 1902, 1903, 1904, and 1905. Block 1901 recites generating a menu that is configured to accept user input. Block 1902 recites receiving user input which indicates a choice of a value card as a payment option. In one embodiment, the account holder may choose to pay a merchant using a card with stored value for a merchant. The account holder may access the value card option from a website or application that is provided by a financial institution that is affiliated or unaffiliated with the merchant that provided the value card. Transactions involving stored value cards may be processed in a manner similar to transactions involving credit cards or debit cards, as discussed above. Hence, at block 1903, the mobile device 110 may generate a display for a merchant based on the user selected value card. In one embodiment, the generated display may be a barcode, QR code, QR code (with color and/or time) or RF signal that may be read by a merchant scanner. The merchant may receive the barcode or QR code and extract information from the code to process the transaction. Block 1904 recites transferring funds from the balance of the selected value card to the merchant. Block 1905 recites reducing the balance of the selected value card. For example, if the stored value card is not merchant-issued, then it may be processed in a manner similar to credit cards as described above. If the stored value card is a merchant-issued card, backend systems may be accessed to reduce the balance of the card and complete the transaction.

Figure 19B:
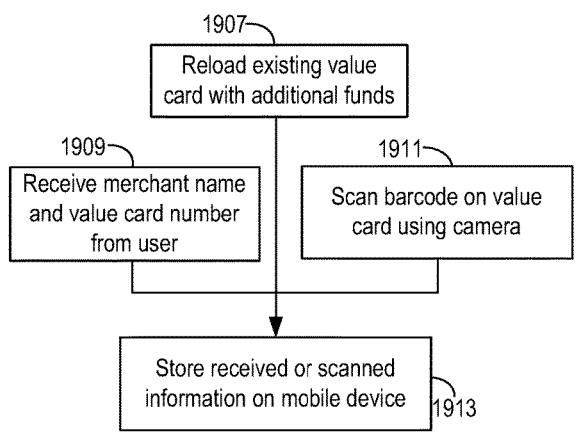
FIG. 19b is a process implemented by the payment processing system of FIG. 17.

FIG. 19b is a process implemented by the value card aggregator 1715 of FIG. 17 in connection with loading information from a stored value card into the mobile device 110. The process from FIG. 19b includes blocks 1907, 1909, 1911, and 1913. At block 1907, the account holder with a value card can reload the existing value card to increase the balance on the card. At block 1909, the account holder can provide the card value provider's name and the number for a stored value card to store on the mobile wallet application. Alternatively, at block 1911, the account holder may user a camera or imaging device to capture the barcode that is physically on the value card. Next, at block 1913, the data from block 1907, 1909 and 1911 can be stored on the mobile device 110.

Figure 20:
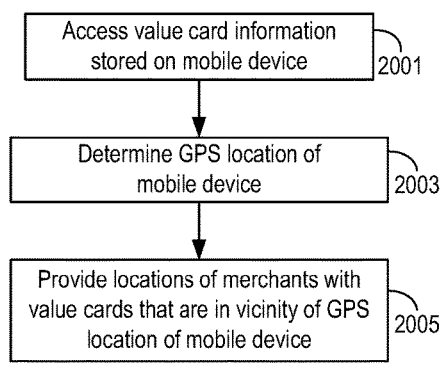
FIG. 20 is a process implemented by the payment processing system of FIG. 17.

FIG. 20 is a process implemented by the payment processing system of FIG. 17 in connection with providing an alert about stored value card. The process from FIG. 19c includes block 2001, 2003, and 2005. At block 2001, value card information stored on the mobile device 110 is accessed. At block 2003, the mobile device 110 determines the GPS location of the mobile device 110. At block 2005, the mobile device 110 determines the merchants that are in the vicinity of the GPS location of the mobile device 110. If the mobile device 110 determines that the merchants that are in the vicinity match the value cards that are stored on the mobile device 110, then the mobile wallet application 116 on the mobile device 110 may generate an alert for the account holder. The generated alert may be displayed by the mobile device 110 and may inform the account holder that a value card is available to be used at a nearby merchant. In another embodiment, the alert may inform the account holder the balance on the value card that is available.

Figure 21:
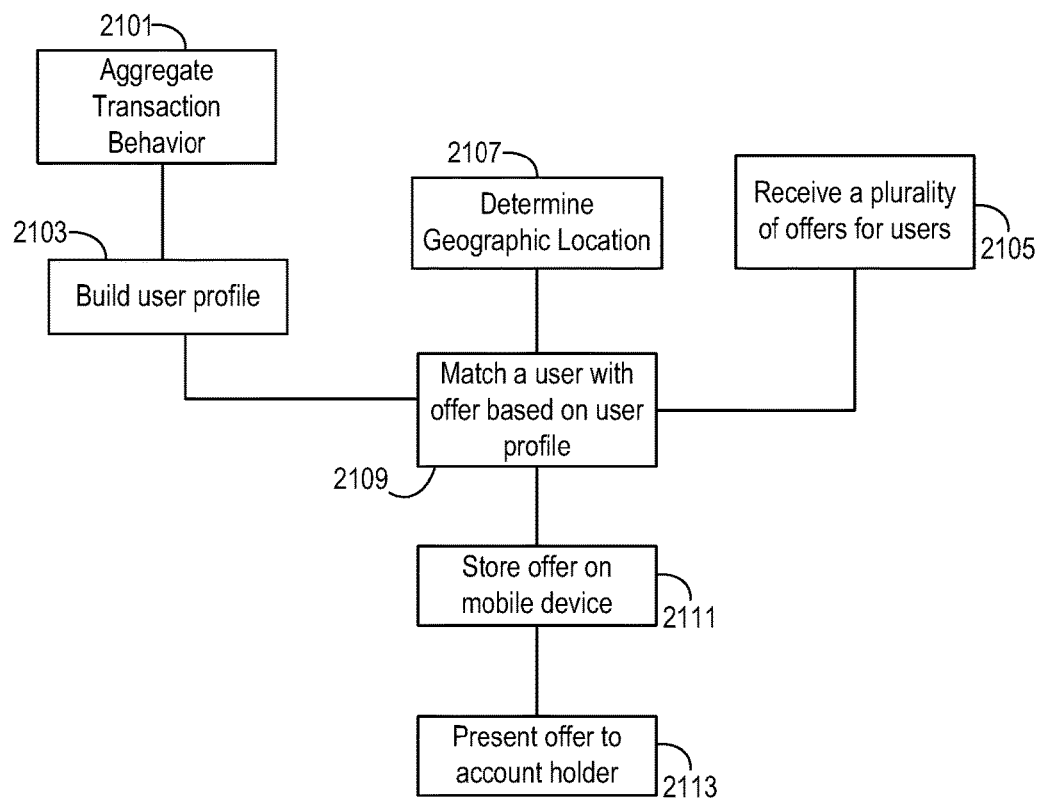
FIG. 21 is a process implemented by the payment processing system of FIG. 17.

FIG. 21 is a process implemented by the payment processing system of FIG. 17. The process of FIG. 21 may be used to determine and present a financial incentive (e.g., offers, coupons, rebates, etc.) to an account holder. For example, the account holder may opt in to receive offers that are selected as being likely to be considered relevant or helpful by the account holder. The process of FIG. 21 includes blocks 2101, 2102, 2103, 2105, 2107, 2109, 2111, and 2113. At block 2101 the bank computer system 120 may aggregate transaction information stored in the account data base 1734 regarding the account holder. At step 2103, the aggregated transaction information is used to build a profile for the account holder. For example, the transaction information may be analyzed to obtain information regarding stores that the account holder frequently visits, the amount of money the account holder typically spends at various types of stores, the monthly spending habits of the account holder, the timing of income payments received by the account holder, seasonal spending patterns of the account holder, and so on. To the extent receipts for transactions conducted using the mobile device 110 are received by the mobile device 110, such receipts may also be analyzed to assess spending habits of the account holder. Additionally, in order to make the information that is provided more relevant to the account holder, the account holder may also opt in to provide information regarding the account holders interests, hobbies, and so on. This information may also be stored as attributes in the user profile.

At block 2105, the bank computer system 120 receives offers and coupon to offer to a plurality of account holders. For example, advertisers may provide such offers to the bank computer system 120 to provide to the account holder. As another example, offers from a third party advertisement network may be utilized. At block 2107, a current position of the mobile device 110 is determined. At block 2109, based on the user profile, the available offers, and the current position of the account holder, the profiles are matched with the offers received. Upon selecting an offer or coupon that matches the profile of the account holder, the offer or coupon is sent to the mobile device 110. The mobile device 110 receives the offer or coupon and stores it in the offer engine 1731 at block 2111. The offer engine 1731 can alert the account holder regarding the offer while the mobile device 110 of the account holder is at a geographic location to use the offer or coupon. The offer engine 1731 may present the offer to the account holder at block 2113 via a display of the mobile device 110.

In another embodiment, the offer engine 1731 may present the offer to the account holder at block 2113 based on the fact the other users' with similar characteristics recommended a merchant, purchased items at a merchant, and so on. The other users with similar characteristics may be determined based on the account holder's connections in an online social network. An offer generated based on other users past transactions may indicate that the offer is generated based on the past transactions of the account holder's connections in the social network. At step 2109, matching a user with offers may also occur by the user indicating an approval of a particular offer, type of offer or a set of offers. The user's approval for one offer may be used to determine which future offers are presented to the user. For example, if the user approves of a 50% off flowers offer, then any future offers for 50% off other products, which may or may not be related to the approved offer, such as chocolates, may be selected from among a plurality of offers to present to the user. After an offer has been presented to the user, the user may be given a choice to use the offer or send the offer to a friend using a form of communication. The form of communication from the user to the friend may be an online social network (e.g. google+™ Facebook™, Myspace™, LinkedIn™, or other online social networks). In another embodiment, the offer may be communicated by transmitting the offer through the mobile wallet application of the user to the mobile wallet application of the friend. In one embodiment, the account holder may be able to add an offer to the mobile wallet application by using an online social network. The online social network may have a wallet application area where the user may receive offers and send offers to other friends.

Figure 22:
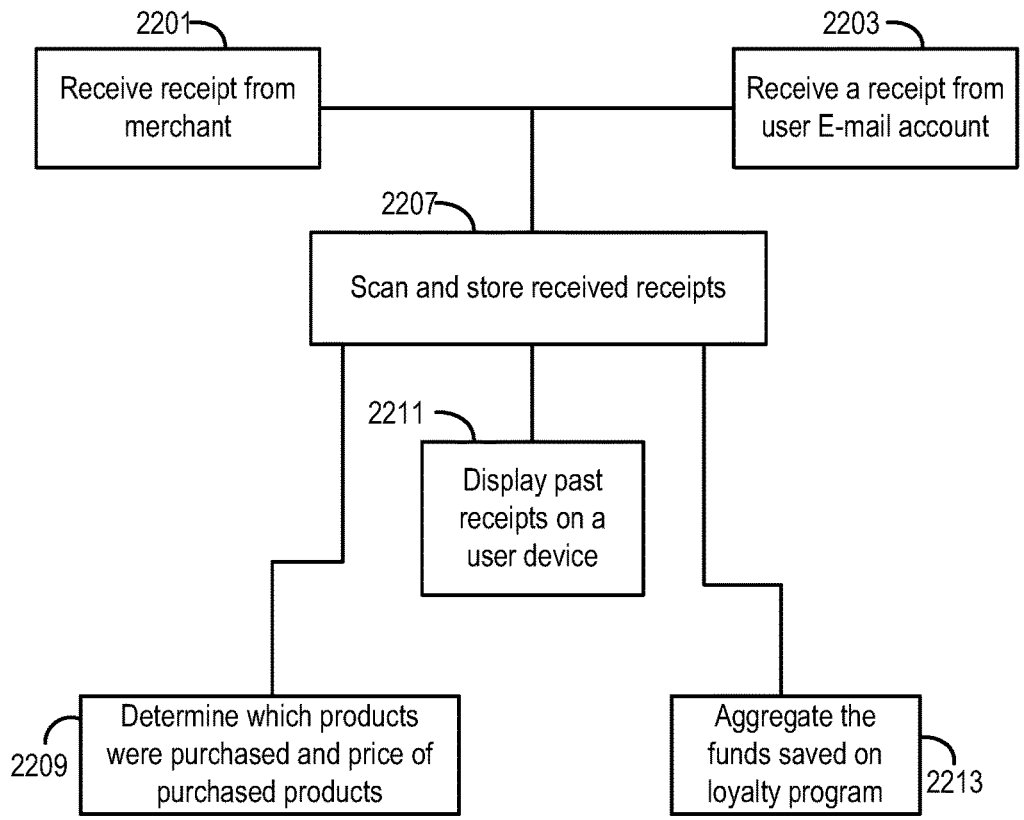
FIG. 22 is a process implemented by the payment processing system of FIG. 17.

Referring to FIG. 22, FIG. 22 is a process implemented by the payment processing system of FIG. 17 in connection with tracking receipts. The process of FIG. 22 may be performed by the mobile device 110 or the bank computer system 120 to track receipts. The process of FIG. 22 includes blocks 2201, 2203, 2207, 2209, 2211, 2213, and 2215. At block 2203, a merchant may send a receipt to a mobile wallet account of a mobile device 110. For example, such a receipt may be sent whenever a transaction is completed using the mobile device 110. At block 2203, the mobile device 110 receives a receipt from an account holder's E-mail address. In one embodiment, an account holder may register the E-mail address with the mobile wallet account. In another embodiment, the mobile wallet account may be assigned an e-mail address to receive receipts. In yet another embodiment, the receipts may be E-mailed in an electronic format. At block 2207, the receipts are scanned for information and stored (e.g., at the bank computer system 120). For example, at block 2209, the mobile wallet application 116 may determine which products were purchased and the price of the purchased products. Such information may be used to build a user profile, as previously discussed.

At step 2211, past receipts that are stored in the mobile wallet account may be retrieved and displayed to a user of a mobile device 110. In another embodiment, an account holder may search the receipts for transactions relating to specific products or merchants. The receipts may also be geo-tagged when the receipts are stored, and such searches may be performed based on the geo-tag information. Tools may be provided to facilitate organizing the receipts for inclusion in expense reports. For example, tools may be provided that permit the account holder to add comments to receipts and to transmit the receipts to third parties. At block 2213, the mobile wallet scans the received receipt and determines the amount of funds saved from a merchant loyalty program. After scanning the receipt, the mobile wallet application 116 aggregates the funds saved on the loyalty program.

Figure 23:
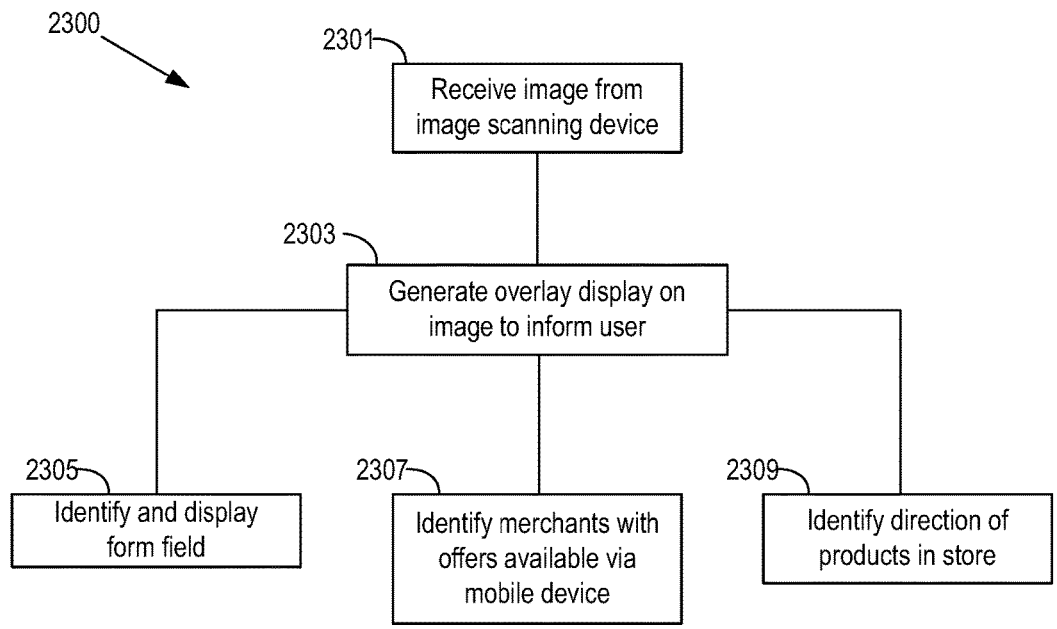
FIG. 23 is a process implemented by the payment processing system of FIG. 17.

Referring to FIG. 23, FIG. 23 illustrates an augmented reality process 2300 that may be implemented using the mobile device 110. At step 2301, the mobile device 110 generates an image or set of images from a camera or image scanning device located in the mobile device 110. At step 2303, the mobile wallet application 116 on the mobile device 110 may generate an overlay display on the image or set of images to provide additional information to the account holder. The additional information may be an image, sound, set of images with sounds, video, and graphics or GPS data. Different types of information may be provided. For example, at block 2305, if the image received by the mobile device 110 is a form, then the mobile device 110 may display fields that may be filled out by the account holder providing input. As another example, at block 2307, if the image received by the mobile device 110 is an image of a street, then merchants with offers available via the mobile device 110 may be displayed as an overlay on the image on the mobile device 110. When the merchants with offers are displayed, the user may also be provided a profile of the merchant and an online storefront. The profile of the merchant may include information regarding the merchant. The online storefront displays items that a user can select and purchase from the merchant for in-person delivery at a physical store or delivery at a user specified location (e.g. addresses such as home, business or friend or family home or business). The geographic location and the orientation of the mobile device 110 may be determined. As the orientation of the mobile device 110 changes, the overlay may move or change in synchronism with the changing image according to the orientation of the mobile device 110. As another example, at block 2309, if the mobile device 110 is located in a store, then the overlay displayed can show the direction of a product or products that are on sale or have offers available via the mobile device 110. The overlay showing the direction of the product or products may be dynamically updated as the account holder walks toward the product, thereby helping the account holder find the product within the store.

Figure 24:
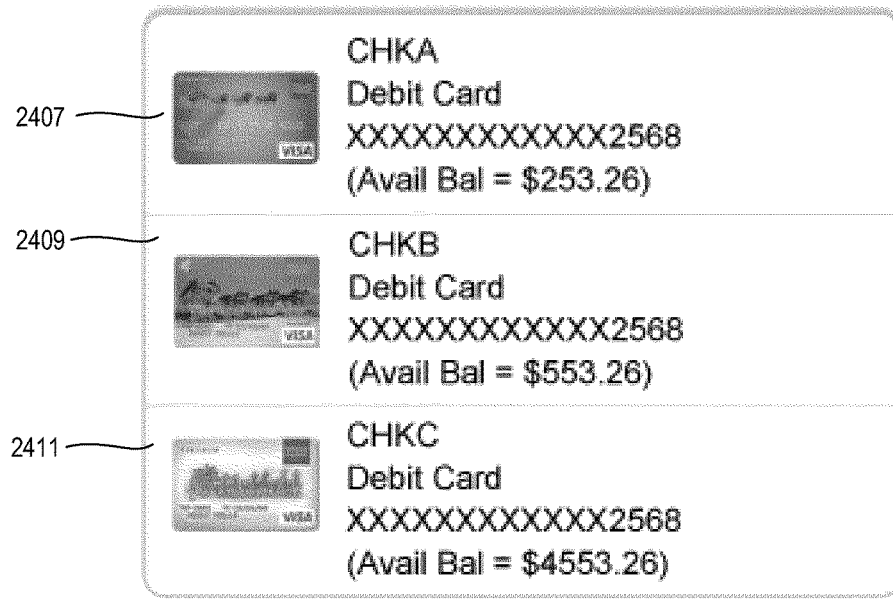
FIG. 24 is a screen shot showing a user choosing the default financial institution account for the mobile wallet application.

FIGS. 24-27 show additional screen displays of a sample mobile wallet client application. Referring first to FIG. 24, FIG. 24 is a screen display that is generated by the mobile wallet application 116. The display in FIG. 24 is generated when an account holder initiates the registration of the mobile wallet account. As shown in FIG. 24, the account holder is provided the choice of selecting the default payment account for the mobile wallet account. For example, the choices shown in FIG. 24 includes, debit card 2407 that is the debit card for account number ending 2468. Another option may be debit card 2409 that is the debit card for account number ending 2568. If the account holder uses conventional banking services of the bank that offers the mobile wallet, then the information shown in FIG. 24 may be prepopulated using the account holder's existing account information.

In the example shown in FIG. 24, the account holder has configured the mobile wallet for use with several demand deposit accounts. As previously indicated, the mobile wallet may also be configured for use with other forms of payment, such as stored value cards. As another example, the mobile wallet may be configured for use with a payment mechanism that allows for direct transfers of funds from a demand deposit account of the account holder to an account of the merchant (e.g., akin to an online bill pay mechanism, but accessible via the mobile wallet application 116 at a point of sale). Such an arrangement may permit funds to be transferred to the merchant while avoiding the need to provide the merchant with account information (e.g., a credit card or debit card number) of the account holder.

In the example shown in FIG. 24, the account holder selects a default account for use with the mobile wallet. As will be appreciated, the default account need not be used for all mobile wallet transactions. As another example, different types of transactions (e.g., by merchant, by dollar amount, etc.) may have different default accounts used for payment. That is, the mobile wallet application 116 may provide the account holder with the ability to set preferences for when certain payment types are used in certain situations. For example, the default account used for payment may be a store-issued credit card when the account holder is making a purchase at the store that issued the credit card. As another example, the default account may be a debit card when the purchase amount is below a threshold (e.g., below $50) and a credit card when the purchase amount is equal to or greater than threshold (e.g., $50 or more). The account holder may be provided with the ability to specify such thresholds and what accounts are used as a function of whether the thresholds are met.

As another example, the defaults may be selected automatically by the mobile wallet application 116. For example, the mobile wallet application 116 may be configured to analyze past transaction history to select a default payment type for presentation to the account holder at the time of a purchase. For example, an account holder that frequently travels for business may typically use an employer-provided credit card for purchases that are made when traveling. For example, if the account holder lives in San Francisco, then the employer-provided credit card may be the most-frequently used credit card whenever the account holder makes purchases that are more at a merchant location that is 100 miles or more away from San Francisco. At the time of a transaction, if the transaction is occurring at a merchant location that is 100 miles or more away from San Francisco, then the account holder may be provided with the employer-provided credit card as a default account, on the assumption that the account holder is traveling on business when the purchase is being made and the purchase is work-related. As another example, the account holder may have a tendency to use specific credit cards at specific stores. Hence, at the time of a transaction, the past transaction history may be analyzed to determine what credit card the account holder typically uses at the store where the transaction is occurring.

The account holder is provided an option to select between each of the debit cards or credit cards that are linked to the bank account portion of the mobile wallet application 116. In another embodiment, the mobile wallet application 116 may allow an account holder to enter a debit or credit card number to use as the default account. After receiving the account holder's choice of debit card the account holder may select the continue button 2413. After selecting the debit card account the account holder may be prompted to provide a pin for the default account. In one embodiment, the pin may be a 4 digit number that is used for the mobile wallet account. In one embodiment, the pin for the mobile wallet account does not change the pin related to the underlying bank account.

Figure 25:
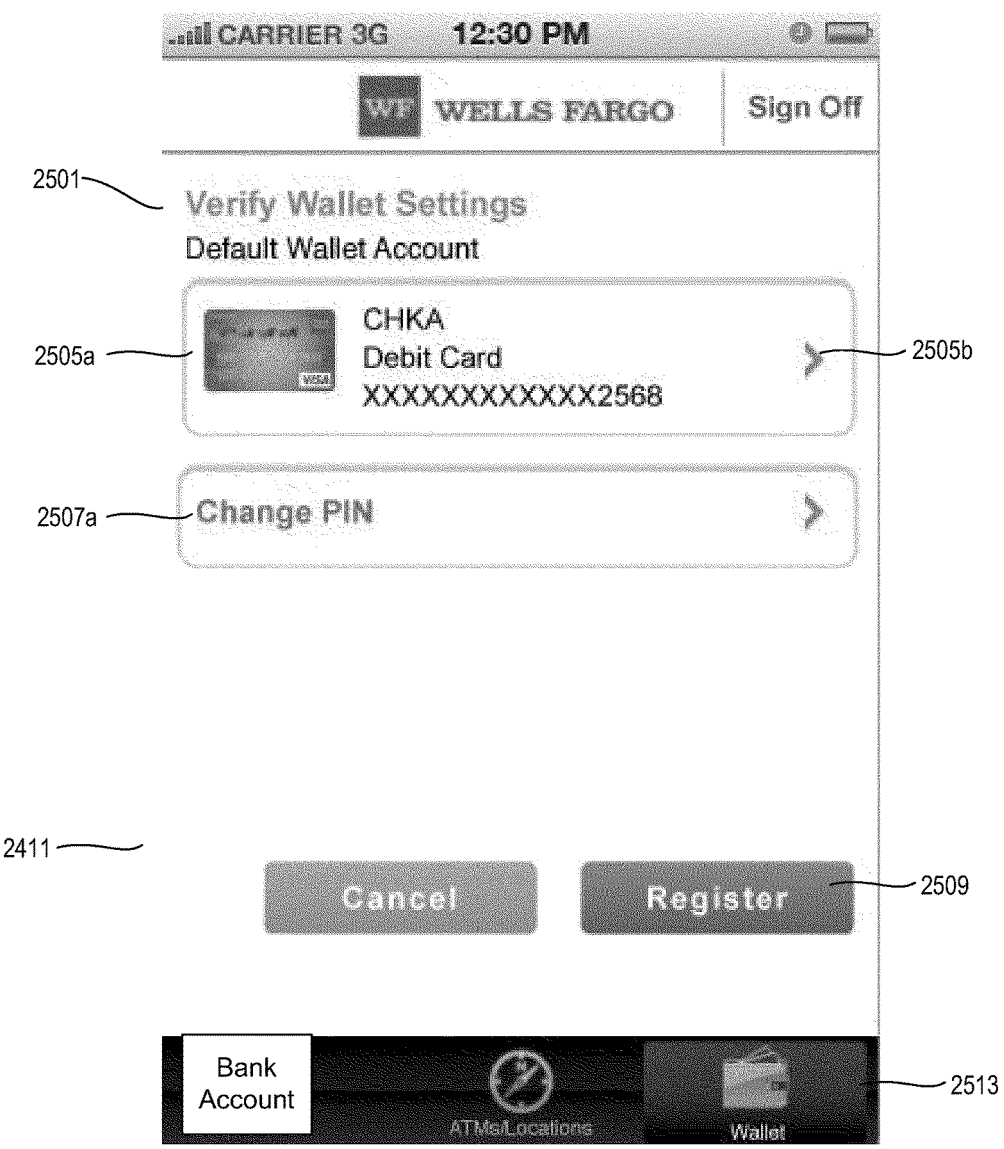
FIG. 25 is a screen shot showing a user verifying the default financial institution account choice.

Referring to FIG. 25, FIG. 25 shows a screen display that allows a user to verify the wallet settings in menu 2501. Menu item 2505*a* displays the default wallet account that the user selected. Also displayed is an option 2505*b* that, if selected, may allow the account holder to choose a different debit card or credit card. Also shown in FIG. 25 is a change pin option 2507*a*, which allows the account holder to select the option to enter a new PIN number. To complete the mobile wallet account registration, the account holder may select the register button 2509.

Figure 26:
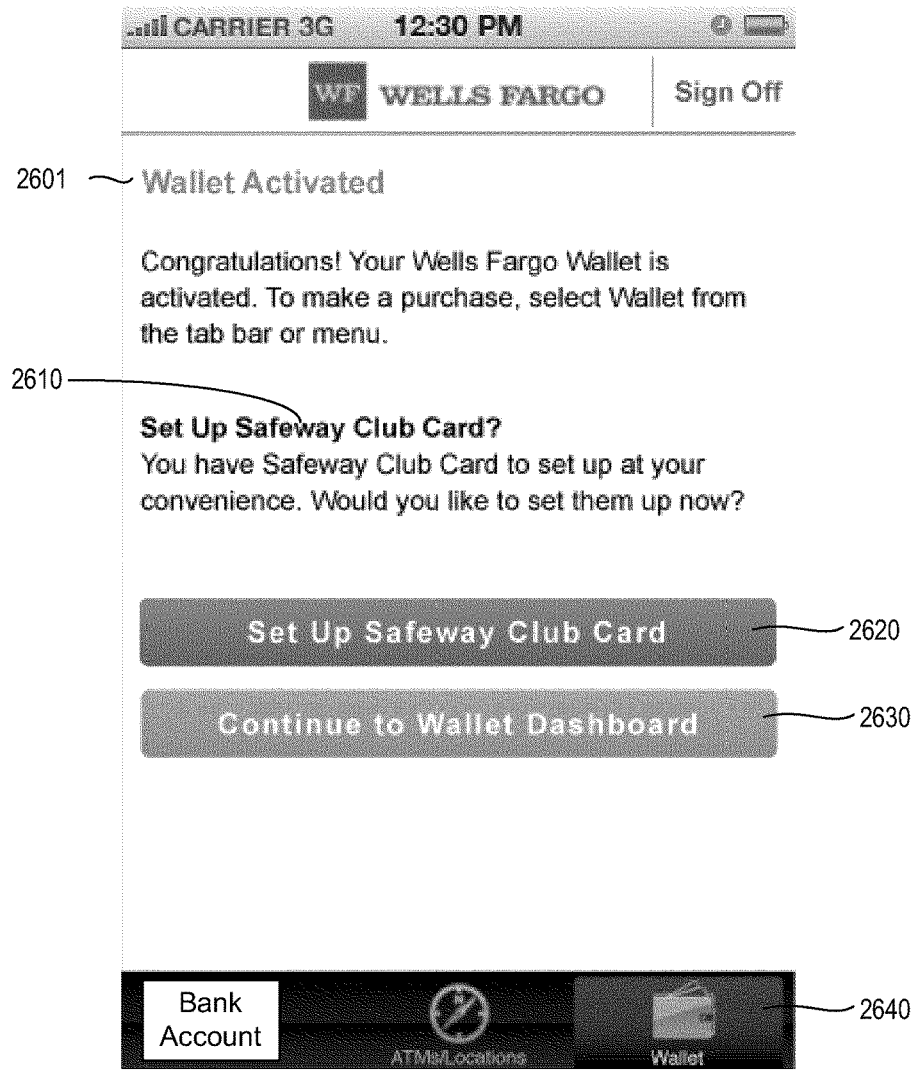
FIG. 26 is a screen shot showing a user linking a merchant loyalty card with the mobile wallet account.

Referring to FIG. 26, FIG. 26 shows a screen that informs an account holder that their wallet account has been activated and the account holder may link their wallet account to a loyalty card of a merchant. In the example shown on FIG. 26, the account holder is offered the option to provide loyalty card information to the mobile wallet account by selecting button 2620. Alternatively or additionally, the account holder may continue to a mobile wallet dashboard by selecting button 2630.

Figure 27:
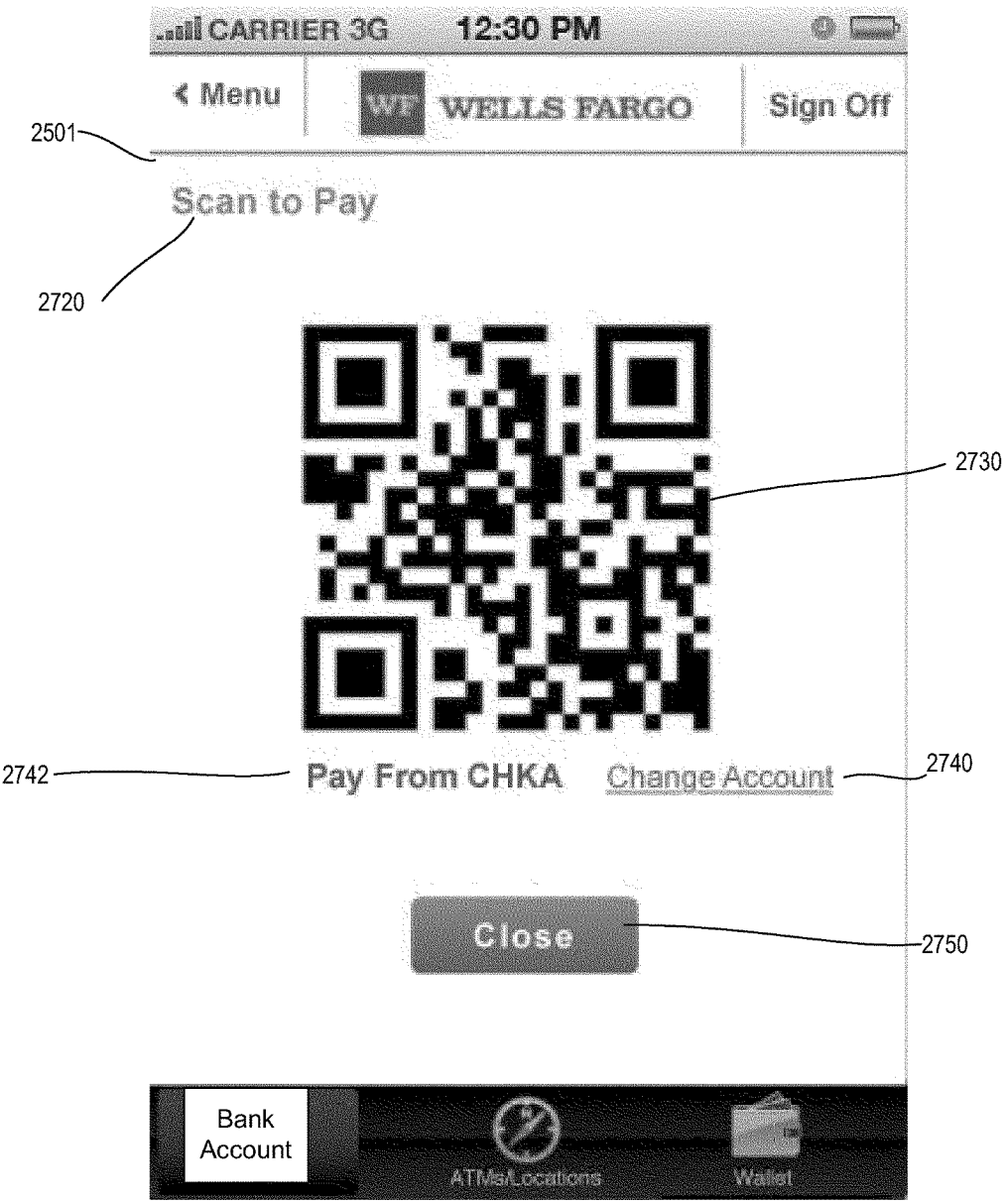
FIG. 27 is a screen shot showing QR code that may be scanned by a merchant to process financial transactions.

Referring to FIG. 27, FIG. 27 illustrates a screen display of a QR code that may be generated for a merchant to scan. The QR code may be displayed by the mobile device 110 based on information provided by the bank computer system 120. When the QR code is generated and displayed on the mobile device 110, the account that will be used to pay the merchant is identified under the QR code at field 2742. If the account holder wishes to use a different account, the account holder is offered the option of changing the account using the change account option button 2740. Once the merchant or individual has scanned the QR code, the account holder may select the close button 2750 to close the mobile wallet application 116.

After scanning the QR code, the merchant may transmit the QR code to the bank computer system 120, as previously described. The bank computer system 120 may then return account information (e.g., a credit card number, debit card number, etc.) to backend servers associated with the merchant computer system 140 to permit the transaction to be processed in the same manner as a conventional credit card or debit card transaction. As previously mentioned, stored value cards may also be used.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A computer-implemented method, comprising:
    directing a mobile device to capture a first geographic location of the mobile device when a mobile wallet transaction is initiated;
    receiving the first geographic location and a code comprising location information of a merchant and a transaction identification number from the mobile device;
    determining, based on the code, a second geographic location of the mobile device after the mobile wallet transaction is initiated, wherein the second geographic location of the mobile device is based on the location information of the merchant;
    comparing the first and second geographic locations to ensure a match;
    permitting the mobile device to process the mobile wallet transaction upon determining that the first and second geographic locations of the mobile device are within a predefined distance of each other;
    directing the mobile device to amend the code to include authentication information for a financial institution associated with a user;
    directing the financial institution to receive the amended code from the mobile device to transfer funds from an account held by the user to the merchant; and
    transferring funds to a merchant after verifying that the second geographic location of the mobile device is within a predetermined distance of a location of the merchant.

2. The method of claim 1, further comprising:
    sending a request to a user of the mobile device for approval to transfer funds; and
    transferring funds to the merchant from the account associated with the user upon receiving approval from the user.

3. The method of claim 1, further comprising:
    analyzing transaction information to determine a spending pattern of a user of the mobile device, wherein the spending pattern includes determining which time of day, week, month or year the user purchases products or services from one or more merchants; and
    presenting at least one offer to the user based on the spending pattern.

4. The method of claim 3, wherein the at least one offer is based on the first or second geographic location.

5. The method of claim 1, further comprising:
    determining that the second geographic location is inside of a predetermined geographic region prior to permitting the mobile device to process the mobile wallet transaction.

6. A computer system, comprising a processor coupled to a non-transitory memory, wherein the processor is configured to:
    direct a mobile device to capture a first geographic location of the mobile device when a mobile wallet transaction is initiated;
    receive the first geographic location and a code comprising location information of a merchant and a transaction identification number from the mobile device;
    determine, based on the code, a second geographic location of the mobile device after the mobile wallet transaction is initiated, wherein the second geographic location of the mobile device is based on the location information of the merchant;
    compare the first and second geographic locations to ensure a match;
    permit the mobile device to process the mobile wallet transaction upon determining that the first and second geographic locations of the mobile device are within a predefined distance of each other;
    direct the mobile device to amend the code to include authentication information for a financial institution associated with a user;
    direct the financial institution to receive the amended code from the mobile device to transfer funds from an account held by the user to the merchant; and
    transfer funds to a merchant after verifying that the second geographic location of the mobile device is within a predetermined distance of a location of the merchant.

7. The system of claim 6, wherein the processor is further configured to:
    send a request to a user of the mobile device for approval to transfer funds; and
    transfer funds to the merchant from the account associated with the user upon receiving approval from the user.

8. The system of claim 6, wherein the processor is further configured to:

analyze transaction information to determine a spending pattern of a user of the mobile device, wherein the spending pattern includes determining which time of day, week, month or year the user purchases products or services from one or more merchants; and present at least one offer to the user based on the spending pattern.

9. The system of claim 8, wherein the at least one offer is based on the first or second geographic location.

10. The system of claim 6, wherein the processor is further configured to:

determine that the second geographic location is inside of a predetermined geographic region prior to permitting the mobile device to process the mobile wallet transaction.

11. A non-transitory machine-readable media having computer-executable instructions embodied therein that, when executed by a processor of a computing system, cause the computing system to perform a process including:

directing a mobile device to capture a first geographic location of the mobile device when a mobile wallet transaction is initiated;

receiving the first geographic location and a code comprising location information of a merchant and a transaction identification number from the mobile device;

determining, based on the code, a second geographic location of the mobile device after the mobile wallet transaction is initiated, wherein the second geographic location of the mobile device is based on the location information of the merchant;

comparing the first and second geographic locations to ensure a match;

permitting the mobile device to process the mobile wallet transaction upon determining that the first and second geographic locations of the mobile device are within a predefined distance of each other;

directing the mobile device to amend the code to include authentication information for a financial institution associated with a user;

directing the financial institution to receive the amended code from the mobile device to transfer funds from an account held by the user to the merchant; and transferring funds to a merchant after verifying that the second geographic location of the mobile device is within a predetermined distance of a location of the merchant.

12. The machine-readable media of claim 11, having computer-executable instructions embodied therein that, when executed by a processor of a computing system, cause the computing system to perform a process further comprising:

sending a request to a user of the mobile device for approval to transfer funds; and transferring funds to the merchant from the account associated with the user upon receiving approval from the user.

13. The machine-readable media of claim 11, having computer-executable instructions embodied therein that, when executed by a processor of a computing system, cause the computing system to perform a process further comprising:

analyzing transaction information to determine a spending pattern of a user of the mobile device, wherein the spending pattern includes determining which time of day, week, month or year the user purchases products or services from one or more merchants; and presenting at least one offer to the user based on the spending pattern.

14. The machine-readable media of claim 13, wherein the at least one offer is based on the first or second geographic location.

15. The machine-readable media of claim 11, having computer-executable instructions embodied therein that, when executed by a processor of a computing system, cause the computing system to perform a process further comprising:

determining that the second geographic location is inside of a predetermined geographic region prior to permitting the mobile device to process the mobile wallet transaction.

* * * * *